United States Patent
Imai et al.

(10) Patent No.: US 10,487,169 B2
(45) Date of Patent: *Nov. 26, 2019

(54) MANUFACTURING METHOD FOR PROPYLENE BLOCK COPOLYMER

(71) Applicant: TOHO TITANIUM CO., LTD., Chigasaki-shi, Kanagawa (JP)

(72) Inventors: Masafumi Imai, Chigasaki (JP); Toshihiko Sugano, Chigasaki (JP); Toshiya Uozumi, Chigasaki (JP); Yuta Haga, Chigasaki (JP)

(73) Assignee: TOHO TITANIUM CO., LTD., Chigasaki-shi (JP)

( * ) Notice: Subject to any disclaimer, the term of this patent is extended or adjusted under 35 U.S.C. 154(b) by 102 days.

This patent is subject to a terminal disclaimer.

(21) Appl. No.: 15/504,482

(22) PCT Filed: Aug. 14, 2015

(86) PCT No.: PCT/JP2015/072958
§ 371 (c)(1),
(2) Date: Feb. 16, 2017

(87) PCT Pub. No.: WO2016/031600
PCT Pub. Date: Mar. 3, 2016

(65) Prior Publication Data
US 2017/0240682 A1 Aug. 24, 2017

(30) Foreign Application Priority Data
Aug. 26, 2014 (JP) ................................ 2014-171860

(51) Int. Cl.
*C08F 297/06* (2006.01)
*C08F 4/654* (2006.01)
*C08F 297/08* (2006.01)
*C08F 210/06* (2006.01)

(52) U.S. Cl.
CPC .......... *C08F 297/083* (2013.01); *C08F 4/654* (2013.01); *C08F 210/06* (2013.01); *C08F 297/06* (2013.01)

(58) Field of Classification Search
CPC ...... C08F 4/654; C08F 210/06; C08F 293/00; C08F 2093/05; C08F 297/06; C08F 297/08; C08F 297/083
See application file for complete search history.

(56) References Cited

U.S. PATENT DOCUMENTS

| 5,747,595 A | 5/1998 | Saito et al. |
| 6,191,232 B1 * | 2/2001 | Mitsutani ............... C08F 297/08 525/240 |
| 2005/0202958 A1 | 9/2005 | Yoshikiyo et al. |
| 2010/0168341 A1 | 7/2010 | Fujiwara |
| 2014/0343237 A1 * | 11/2014 | Sugano ................... C08F 10/00 526/123.1 |

FOREIGN PATENT DOCUMENTS

| JP | 61-69822 A | 4/1986 |
| JP | 63-225613 A | 9/1988 |
| JP | 6-228223 A | 8/1994 |
| JP | 8-3215 A | 1/1996 |
| JP | 8-67710 A | 3/1996 |
| JP | 8-269123 A | 10/1996 |
| JP | 9-87329 A | 3/1997 |
| JP | 11-35621 A | 2/1999 |
| JP | 2004-182981 A | 7/2004 |
| JP | 2006-131915 A | 5/2006 |
| JP | 2010-168546 A | 8/2010 |
| JP | 2011-195664 A | 10/2011 |
| JP | 2012-214556 A | 11/2012 |
| WO | WO-2013042400 A1 * | 3/2013 |

OTHER PUBLICATIONS

International Search Report dated Nov. 17, 2015, issued in counterpart International Application No. PCT/JP2015/072958 (2 pages).
Written Opinion of International Search Authority dated Nov. 17, 2015, issued in counterpart International Application No. PCT/JP2015/072958 (4 pages).

* cited by examiner

*Primary Examiner* — Irina S Zemel
*Assistant Examiner* — Jeffrey S Lenihan
(74) *Attorney, Agent, or Firm* — Westerman, Hattori, Daniels & Adrian LLP

(57) ABSTRACT

A method for producing a propylene-based block copolymer produces a propylene-based copolymer that exhibits excellent stereoregularity, rigidity, and impact resistance in a convenient and efficient manner while achieving high polymerization activity. The method for producing a propylene-based block copolymer includes bringing a catalyst into contact with propylene, or propylene and an α-olefin, and bringing an electron donor compound into contact with the resulting product to produce a propylene-based block copolymer, the catalyst including a solid catalyst component that includes titanium, magnesium, a halogen, and an internal electron donor compound, a specific organoaluminum compound, and a specific external electron donor compound.

6 Claims, No Drawings

MANUFACTURING METHOD FOR PROPYLENE BLOCK COPOLYMER

TECHNICAL FIELD

The present invention relates to a method for producing a propylene-based block copolymer.

BACKGROUND ART

An olefin (e.g., propylene) is commonly polymerized using an olefin polymerization catalyst. In particular, a propylene-based block copolymer produced using an olefin polymerization catalyst is widely used since rigidity and impact resistance are achieved in a well-balanced manner.

In particular, a propylene-ethylene block copolymer is used for a wide range of applications since the propylene-ethylene block copolymer exhibits excellent mechanical properties (e.g., rigidity and heat resistance), and can be produced relatively inexpensively.

A propylene-ethylene block copolymer is a blend of a polymer component that mainly includes propylene, and a random copolymer component obtained by copolymerizing propylene and ethylene, and is normally produced by sequentially effecting polymerization under the conditions that correspond to each component to blend the components within the reaction vessel.

For example, a propylene-based block copolymer that is obtained by performing a first step that effects homopolymerization of propylene, or random copolymerization of propylene and a small amount of ethylene, and performing a second step that effects copolymerization of propylene and ethylene, or propylene and another α-olefin, is widely used. The resulting propylene-based block copolymer may be melted, formed (molded) using a forming (molding) machine, a stretching machine, or the like, and used for a variety of applications (e.g., automotive part, home appliance part, container, and sheet).

A solid catalyst component that includes magnesium, titanium, an electron donor compound, and a halogen atom as essential components is known as a component of the olefin polymerization catalyst that is used to produce a propylene-based block copolymer. A number of olefin polymerization catalysts including the solid catalyst component, an organoaluminum compound, and an organosilicon compound have been proposed.

Technology that produces a propylene-based block copolymer is required to produce polypropylene that exhibits high stereoregularity that affects rigidity in order to obtain a propylene-based block copolymer that exhibits rigidity and impact resistance in a well-balance manner, achieve high copolymerization activity in the second step in order to improve impact strength, achieve high randomness with respect to the ethylene distribution and the like in the copolymer, and ensure excellent polymerization controllability through high polymerization sustainability.

A propylene-ethylene block copolymer is widely used to produce an automotive bumper and the like by means of injection molding. Therefore, technology for producing a propylene-ethylene block copolymer having an improved melt flow rate (MFR) has been desired in order to improve the productivity of the injection molding process.

The MFR of a propylene-ethylene block copolymer is uniquely determined by the MFR of the propylene polymer component, the MFR of the propylene-ethylene random copolymer component, and the content of the random copolymer component in the block copolymer. It is necessary to adjust the MFR of the random copolymer component and the content of the random copolymer component to be equal to or larger than specific values in order to improve the impact strength of the propylene-ethylene block copolymer. Since it is desired that the majority of ethylene included in the propylene-ethylene block copolymer be incorporated in the random copolymer, and the amount of crystalline polyethylene be small, technology has been desired that ensures that relatively high polymerization activity is achieved when forming a propylene-ethylene random copolymer (rubber part) (as compared with the polymerization activity when forming polypropylene), and ethylene is efficiently introduced into the random copolymer, and an olefin polymerization catalyst and the like that exhibit relatively high random copolymerization activity have been desired.

A propylene-ethylene block copolymer that is used to produce an automotive bumper and the like has been required to exhibit improved impact strength (particularly improved impact strength at a low temperature). The impact strength at a low temperature depends on the brittle temperature of the random copolymer component. Since the brittle temperature increases when the propylene content in the random copolymer component is too high, and the impact strength at a low temperature becomes in sufficient, it is desirable to decrease the brittle temperature of the random copolymer component by increasing the ethylene content in the random copolymer component.

At present, a propylene-ethylene block copolymer is mainly produced using a gas-phase process. In particular, a gas-phase process that removes the heat of polymerization by utilizing the latent heat of liquefied propylene is considered to be advantageous in that high heat removal performance can be achieved using small-scale equipment.

A method for producing a propylene-ethylene block copolymer using a gas-phase method, wherein a polymer component (a) that mainly includes propylene is produced in the first polymerization step, and a propylene-ethylene random copolymer component (b) is produced in the second polymerization step (see above), has been proposed.

According to this method, however, when the residence time distribution of the polymer particles that have been obtained by the first polymerization step and are subjected to the second polymerization step is wide, the reactor used for the second polymerization step may be fouled, or the impact strength of the block copolymer (product) may decrease.

It is considered that such a problem occurs since the activity of the polymer particles that are subjected to the second polymerization step varies to a large extent due to the wide residence time distribution, and the amount of particles that produce the random copolymer component in the second polymerization step increases to a large extent. Therefore, it is necessary to use a production method that ensures that high polymerization activity is achieved during random copolymerization, the residence time is short, and the residence time distribution is narrow.

Since polypropylene is normally produced using hydrogen that undergoes a chain transfer reaction as a molecular weight modifier, it is necessary to use hydrogen at a high concentration in order to produce polypropylene having a higher MFR (i.e., lower molecular weight).

Therefore, when producing polypropylene having a high MFR using a gas-phase process that utilizes the latent heat of liquefied propylene, there is a tendency that the hydrogen concentration in unreacted propylene gas increases, and the dew point of propylene decreases since hydrogen is used at a high concentration. As a result, productivity decreases due to removal of the heat of polymerization. When producing a random copolymer component having a high comonomer content using a comonomer having a low dew point (e.g., ethylene), the comonomer concentration in unreacted gas increases since the comonomer is used at a high concentration, and the heat removal performance in the recycle system becomes insufficient.

Specifically, when producing a propylene-ethylene block copolymer having a high MFR and a high ethylene content, insufficient heal removal or a decrease in productivity easily occur in the first polymerization step due to a high hydrogen concentration, and insufficient heal removal or a decrease in productivity easily occur in the second polymerization step due to a high ethylene concentration. In order to solve these problems, it is desirable that polypropylene having a high MFR can be produced at a lower hydrogen concentration, and a random copolymer component having a high ethylene content can be produced at a lower ethylene concentration.

Several polymerization catalysts that solve the above problems have been proposed.

For example, a method that improves the hydrogen response by utilizing an aluminum halide when producing a solid catalyst (see Patent Literature 1), a method that utilizes an organoaluminum component and an organozinc component in combination as a promoter (see Patent Literature 2), a method that utilizes an organosilicon compound that includes an amino group (see Patent Literature 3, for example), and the like have been proposed as a method for producing polypropylene having a high MFR.

A method that utilizes a titanium compound that includes a Ti—N linkage (see Patent Literature 4), a method that utilizes an organosilicon compound and a saturated hydrocarbon during second-step polymerization (see Patent Literature 5), and the like have been proposed as a method that solves the problem with regard to the copolymerizability of ethylene.

A method for producing a propylene-ethylene block copolymer, wherein an oxygen-containing compound or the like that is gaseous in a normal state is added when effecting second-step polymerization in order to suppress adhesion between polymer particles and adhesion of polymer particles to the inner wall of the reactor, has been proposed (see Patent Literature 6, for example).

CITATION LIST

Patent Literature

Patent Literature 1: JP-A-2012-214556
Patent Literature 2: JP-A-8-67710
Patent Literature 3: JP-A-8-3215
Patent Literature 4: JP-A-6-228223
Patent Literature 5: JP-A-9-87329
Patent Literature 6: JP-A-61-69822

SUMMARY OF INVENTION

Technical Problem

However, the above methods have problems in that it is difficult to maintain polymerization activity during second or subsequent step copolymerization, and it is impossible to stable produce a propylene-based copolymer that exhibits excellent impact resistance, excellent rigidity, excellent heat resistance, and the like.

In view of the above situation, an object of the invention is to provide a method for producing a propylene-based block copolymer that ensures that excellent polymerization activity is obtained when homopolymerizing propylene, or copolymerizing propylene and ethylene or propylene and an α-olefin other than ethylene, and can conveniently produce a propylene-based block copolymer that exhibits excellent stereoregurality, excellent rigidity, and excellent impact resistance in high yield.

Solution to Problem

The inventors conducted extensive studies in order to solve the above technical problem. As a result, the inventors found that the above problem can be solved by is producing a propylene-based block copolymer by bringing an olefin polymerization catalyst into contact with propylene, or propylene and an α-olefin, and bringing an electron donor compound into contact with the resulting product, the olefin polymerization catalyst including a solid catalyst component for olefin polymerization, a specific organoaluminum compound, and a specific external electron donor compound, the solid catalyst component including titanium, magnesium, a halogen, and an internal electron donor compound. This finding has led to the completion of the invention.

Specifically, one aspect of the invention provides the following method for producing a propylene-based block copolymer.

(1) A method for producing a propylene-based block copolymer including bringing an olefin polymerization catalyst into contact with propylene, or propylene and an α-olefin other than propylene, and bringing an electron donor compound (IV) into contact with the resulting product, the olefin polymerization catalyst including a solid catalyst component for olefin polymerization that includes titanium, magnesium, a halogen, and an internal electron donor compound, an organoaluminum compound represented by a general formula (I), and an external electron donor compound represented by a general formula (II) or an external electron donor compound represented by a general formula (III),

wherein $R^1$ is a hydrocarbyl group having 1 to 6 carbon atoms, p is a real number that satisfies $0<p\leq3$, provided that a plurality of $R^1$ are either identical to or different from each other when a plurality of $R^1$ are present, and Q is a hydrogen atom, a hydrocarbyloxy group having 1 to 6 carbon atoms, or a halogen atom, provided that a plurality of Q are either identical to or different from each other when a plurality of Q are present,

wherein $R^2$ is a hydrogen atom, a linear alkyl group having 1 to 20 carbon atoms, a branched alkyl group having 3 to 20 carbon atoms, a vinyl group, an allyl group, a linear or branched alkenyl group having 3 to 20 carbon atoms, a cycloalkyl group having 3 to 20 carbon atoms, a cycloalkenyl group having 3 to 20 carbon atoms, an aromatic hydrocarbon group having 6 to 24 carbon atoms, a nitrogen atom-containing hydrocarbon group having 2 to 24 carbon atoms that is terminated by a carbon atom, or an amino group having 2 to 24 carbon atoms, and $R^3$ is a linear alkyl group having 1 to 20 carbon atoms, a branched alkyl group having 3 to 20 carbon atoms, a vinyl group, an allyl group, a linear or branched alkenyl group having 3 to 20 carbon atoms, a cycloalkyl group having 3 to 20 carbon atoms, a cycloalkenyl group having 3 to 20 carbon atoms, or an aromatic hydrocarbon group having 6 to 24 carbon atoms, provided that the three $R^3$ are either identical to or different from each other,

wherein R⁴ and R⁵ are a hydrogen atom, a linear alkyl group having 1 to 20 carbon atoms, a branched alkyl group having 3 to 20 carbon atoms, a vinyl group, an allyl group, a linear or branched alkenyl group having 3 to 20 carbon atoms, a cycloalkyl group having 3 to 20 carbon atoms, a cycloalkenyl group having 3 to 20 carbon atoms, an aromatic hydrocarbon group having 6 to 24 carbon atoms, a nitrogen atom-containing hydrocarbon group having 2 to 24 carbon atoms that is terminated by a carbon atom, or an amino group having 2 to 24 carbon atoms, provided that R⁴ and R⁵ are either identical to or different from each other, and are optionally bonded to each other to form a ring, and R⁶ is a linear alkyl group having 1 to 20 carbon atoms, a branched alkyl group having 3 to 20 carbon atoms, a vinyl group, an allyl group, a linear or branched alkenyl group having 3 to 20 carbon atoms, a cycloalkyl group having 3 to 20 carbon atoms, a cycloalkenyl group having 3 to 20 carbon atoms, or an aromatic hydrocarbon group having 6 to 24 carbon atoms, provided that the three R⁶ are either identical to or different from each other.

(2) The method for producing a propylene-based block copolymer according to (1), wherein the electron donor compound (IV) is an alcohol.

(3) The method for producing a propylene-based block copolymer according to (1) or (2), wherein the electron donor compound (IV) is methanol or ethanol.

(4) The method for producing a propylene-based block copolymer according to any one of (1) to (3), wherein the external electron donor compound represented by the general formula (II) is an external electron donor compound represented by a general formula (IIa), or the external electron donor compound represented by the general formula (III) is an external electron donor compound represented by a general formula (IIIa),

$$R^7Si(OR^8)_3 \qquad (IIa)$$

wherein R⁷ is a hydrogen atom, a linear alkyl group having 1 to 12 carbon atoms, a branched alkyl group having 3 to 12 carbon atoms, a vinyl group, an allyl group, a linear or branched alkenyl group having 3 to 12 carbon atoms, a cycloalkyl group having 3 to 12 carbon atoms, a cycloalkenyl group having 3 to 12 carbon atoms, an aromatic hydrocarbon group having 6 to 12 carbon atoms, a nitrogen atom-containing hydrocarbon group having 2 to 12 carbon atoms that is terminated by a carbon atom, or an amino group having 2 to 12 carbon atoms, and R⁸ is a linear alkyl group having 1 to 12 carbon atoms, a branched alkyl group having 3 to 12 carbon atoms, a vinyl group, an allyl group, a linear or branched alkenyl group having 3 to 12 carbon atoms, a cycloalkyl group having 3 to 12 carbon atoms, a cycloalkenyl group having 3 to 12 carbon atoms, or an aromatic hydrocarbon group having 6 to 12 carbon atoms, provided that the three R⁸ are either identical to or different from each other,

$$(R^9R^{10}N)Si(OR^{11})_3 \qquad (IIIa)$$

wherein R⁹ and R¹⁰ are a hydrogen atom, a linear alkyl group having 1 to 12 carbon atoms, a branched alkyl group having 3 to 12 carbon atoms, a vinyl group, an allyl group, a linear or branched alkenyl group having 3 to 12 carbon atoms, a cycloalkyl group having 3 to 12 carbon atoms, a cycloalkenyl group having 3 to 12 carbon atoms, an aromatic hydrocarbon group having 6 to 12 carbon atoms, a nitrogen atom-containing hydrocarbon group having 2 to 12 carbon atoms that is terminated by a carbon atom, or an amino group having 2 to 12 carbon atoms, provided that R⁹ and R¹⁰ are either identical to or different from each other, and are optionally bonded to each other to form a ring, and R¹¹ is a linear alkyl group having 1 to 12 carbon atoms, a branched alkyl group having 3 to 12 carbon atoms, a vinyl group, an allyl group, a linear or branched alkenyl group having 3 to 12 carbon atoms, a cycloalkyl group having 3 to 12 carbon atoms, a cycloalkenyl group having 3 to 12 carbon atoms, or an aromatic hydrocarbon group having 6 to 12 carbon atoms, provided that the three R¹¹ are either identical to or different from each other.

(5) The method for producing a propylene-based block copolymer according to any one of (1) to (3), wherein the external electron donor compound (II) is one or more compounds selected from isopropyltriethoxysilane, isopropyltrimethoxysilane, n-propyltriethoxysilane, n-propyltrimethoxysilane, methyltriethoxysilane, methyltrimethoxysilane, ethyltriethoxysilane, ethyltrimethoxysilane, n-butyltriethoxysilane, n-butyltrimethoxysilane, isobutyltriethoxysilane, isobutyltrimethoxysilane, t-butyltriethoxysilane, t-butyltrimethoxysilane, cyclopentyltriethoxysilane, cyclohexyltriethoxysilane, phenyltrimethoxysilane, and phenyltriethoxysilane.

(6) The method for producing a propylene-based block copolymer according to any one of (1) to (3), wherein the external electron donor compound (III) is one or more compounds selected from diethylaminotriethoxysilane, diethylaminotrimethoxysilane, dimethylaminotriethoxysilane, and dimethylaminotrimethoxysilane.

Advantageous Effects of Invention

According to one aspect of the invention, since a propylene-based block copolymer is produced using a specific olefin polymerization catalyst by means of specific steps, it is possible to achieve excellent polymerization activity when homopolymerizing propylene, or copolymerizing propylene and an additional olefin, achieve high polymerization sustainability during random copolymerization, and easily control the content of a random copolymer (rubber part) in the resulting block copolymer.

Since the resulting propylene-based block copolymer includes a propylene homopolymer (homopolymerization part) or a crystalline propylene random copolymer that includes a specific amount of propylene and an additional α-olefin, the propylene-based block copolymer exhibits excellent stereoregularity and moderate rigidity. Since the propylene-based block copolymer has a high α-olefin content and a high propylene-α-olefin random copolymer (rubber part) content, the propylene-based block copolymer exhibits excellent impact resistance. Specifically, it is possible to conveniently produce a propylene-based block copolymer that exhibits rigidity, impact resistance, and the like in a well-balanced manner, in high yield.

DESCRIPTION OF EMBODIMENTS

A method for producing a propylene-based block copolymer (hereinafter may be referred to as "production method") according to one embodiment of the invention includes bringing an olefin polymerization catalyst into contact with propylene, or propylene and an α-olefin other than propylene, and bringing an electron donor compound (IV) into contact with the resulting product, the olefin polymerization catalyst including a solid catalyst component for olefin polymerization that includes titanium, magnesium, a halogen, and an internal electron donor compound, an organoaluminum compound represented by the following general formula (I), and an external electron donor compound represented by the following general formula (II) or an external electron donor compound represented by the following general formula (III), $$R^1_p AlQ_{3-p} \quad (I)$$

wherein $R^1$ is a hydrocarbyl group having 1 to 6 carbon atoms, p is a real number that satisfies $0<p\leq3$, provided that a plurality of $R^1$ are either identical to or different from each other when a plurality of $R^1$ are present, and Q is a hydrogen atom, a hydrocarbyloxy group having 1 to 6 carbon atoms, or a halogen atom, provided that a plurality of Q are either identical to or different from each other when a plurality of Q are present, $$R^2 Si(OR^3)_3 \quad (II)$$

wherein $R^2$ is a hydrogen atom, a linear alkyl group having 1 to 20 carbon atoms, a branched alkyl group having 3 to 20 carbon atoms, a vinyl group, an allyl group, a linear or branched alkenyl group having 3 to 20 carbon atoms, a cycloalkyl group having 3 to 20 carbon atoms, a cycloalkenyl group having 3 to 20 carbon atoms, an aromatic hydrocarbon group having 6 to 24 carbon atoms, a nitrogen atom-containing hydrocarbon group having 2 to 24 carbon atoms that is terminated by a carbon atom, or an amino group having 2 to 24 carbon atoms, and $R^3$ is a linear alkyl group having 1 to 20 carbon atoms, a branched alkyl group having 3 to 20 carbon atoms, a vinyl group, an allyl group, a linear or branched alkenyl group having 3 to 20 carbon atoms, a cycloalkyl group having 3 to 20 carbon atoms, a cycloalkenyl group having 3 to 20 carbon atoms, or an aromatic hydrocarbon group having 6 to 24 carbon atoms, provided that the three $R^3$ are either identical to or different from each other, $$(R^4 R^5 N)Si(OR^3)_3 \quad (III)$$

wherein $R^4$ and $R^5$ are a hydrogen atom, a linear alkyl group having 1 to 20 carbon atoms, a branched alkyl group having 3 to 20 carbon atoms, a vinyl group, an allyl group, a linear or branched alkenyl group having 3 to 20 carbon atoms, a cycloalkyl group having 3 to 20 carbon atoms, a cycloalkenyl group having 3 to 20 carbon atoms, an aromatic hydrocarbon group having 6 to 24 carbon atoms, a nitrogen atom-containing hydrocarbon group having 2 to 24 carbon atoms that is terminated by a carbon atom, or an amino group having 2 to 24 carbon atoms, provided that $R^4$ and $R^5$ are either identical to or different from each other, and are optionally bonded to each other to form a ring, and $R^3$ is a linear alkyl group having 1 to 20 carbon atoms, a branched alkyl group having 3 to 20 carbon atoms, a vinyl group, an allyl group, a linear or branched alkenyl group having 3 to 20 carbon atoms, a cycloalkyl group having 3 to 20 carbon atoms, a cycloalkenyl group having 3 to 20 carbon atoms, or an aromatic hydrocarbon group having 6 to 24 carbon atoms, provided that the three $R^3$ are either identical to or different from each other.

The olefin polymerization catalyst used in connection with the production method according to one embodiment of the invention includes the solid catalyst component for olefin polymerization (hereinafter may be appropriately referred to as "solid catalyst component") that includes titanium, magnesium, a halogen, and an internal electron donor compound.

The halogen that is included in the solid catalyst component used in connection with the production method according to one embodiment of the invention may be one or more halogens selected from fluorine, chlorine, bromine, and iodine. The halogen is preferably one or more halogens selected from chlorine, bromine, and iodine, and more preferably chlorine or iodine.

The internal electron donor compound that is included in the solid catalyst component used in connection with the production method according to one embodiment of the invention may be one or more compounds selected from an alcohol, phenol and a derivative thereof, an acid halide, an acid amide, a nitrile, an acid anhydride, an ether compound, an organic acid ester, a silicic acid ester, a compound that includes an ether group and an ester group, a carbonic acid ester compound that includes an ether group, an aldehyde, a ketone, and the like.

Specific examples of the internal electron donor compound include an alcohol such as ethanol, butyl alcohol, 2-ethylhexyl alcohol, and 1,4-butanediol, phenol and a derivative thereof such as phenol, cresol, 2,6-dibutylphenol, 1-naphthol, catechol, and 3,5-dibutylcatechol, an acid halide such as benzoic chloride, phthalic dichloride, and acetyl chloride, a nitrile such as butyramide, phenylamide, phthalic acid diamide, acetonitrile, cyanobenzene, and 2-cyanobenzoic acid ester, an acid anhydride such as phthalic anhydride and acetic anhydride, an ether such as dibutyl ether, diphenyl ether, 1,3-dimethoxy-2,2-di isobutylpropane, and 9,9-dimethoxyfluorene, an organic acid ester such as a monocarboxylic acid ester such as a benzoic acid ester, an isobutyric acid ester, and a norbornylcarboxylic ester, an aromatic dicarboxylic acid diester such as a phthalic acid diester and a napthalenedicarboxylic acid diester, an aliphatic dicarboxylic acid diester such as a malonic acid diester, a succinic acid diester, a maleic acid diester, and a glutaric acid diester, and an alicyclic dicarboxylic acid diester such as a cycloalkanedicarboxylic acid diester and a cycloalkenedicarboxylic acid diester, a silicic acid ester such as tetraethoxysilane, dicyclopentyldimethoxysilane, tetraphenoxysilane, and methyltriphenoxysilane, a compound that includes an ester group and an ether group, such as cellosolve acetate, cellosolve benzoate, and a p-ethoxyethylbenzoic acid ester, a carbonic acid ester compound that includes an ether group, such as (2-ethoxyethyl) methyl carbonate and (2-ethoxyethyl) methyl carbonate, and the like.

The internal electron donor compound may be a substituted carboxylic acid diester or a substituted cycloalkadienylcarboxylic acid diester.

Examples of the substituted carboxylic acid diester include a halogen-substituted carboxylic acid diester in which a hydrogen atom is substituted with a halogen atom such as a fluorine atom, a chlorine atom, a bromine atom, or an iodine atom, an alkyl-substituted carboxylic acid diester in which a hydrogen atom is substituted with an alkyl group having 1 to 8 carbon atoms, an alkyl halide-substituted carboxylic acid diester in which a hydrogen atom is substituted with a halogen atom and an alkyl group having 1 to 8 carbon atoms, and the like.

Examples of the substituted cycloalkadienylcarboxylic acid diester include a substituted cycloalkadienylcarboxylic acid diester in which some of the hydrogen atoms included in the cycloalkadienylcarboxylic acid diester are substituted with an alkyl group or the like, and the like.

The internal electron donor compound is preferably one or more compounds selected from a phthalic acid diester such as diethyl phthalate and dibutyl phthalate, a malonic acid diester such as dimethyl malonate and diethyl malonate, a hydrocarbon-substituted malonic acid diester such as dimethyl diisobutylmalonate, diethyl diisobutylmalonate, and diethyl benzylidenemalonate, a maleic acid diester such as diethyl maleate and di-n-butyl maleate, a carbonic acid ester compound that includes an ether group, such as (2-ethoxyethyl) methyl carbonate and (2-ethoxyethyl) methyl carbonate, a cycloalkanedicarboxylic acid diester such as dimethyl cyclohexane-1,2-dicarboxylate and a 1,1-norbornyldicarboxylic acid diester, and a 1,3-diether such as 2-isopropyl-2-isopentyl-1,3-dimethoxypropane and 9,9-bis(methoxymethyl)fluorene.

The solid catalyst component used in connection with the production method according to one embodiment of the invention may include a polysiloxane.

When the solid catalyst component includes a polysiloxane, it is possible to improve the stereoregularity or the crystallinity of the resulting propylene-based block copolymer, and reduce the amount of fine powder in the resulting propylene-based block copolymer.

A polysiloxane is a polymer that includes a siloxane linkage (—Si—O—) in the main chain, and is also referred to as "silicone oil". The polysiloxane may be a chain-like, partially hydrogenated, cyclic, or modified polysiloxane that is liquid or viscous at room temperature, and has a viscosity at 25° C. of 0.02 to 100 cm$^2$/s (2 to 10,000 cSt), and preferably 0.03 to 5 cm$^2$/s (3 to 500 cSt).

Examples of a preferable chain-like polysiloxane include a disiloxane such as hexamethyldisiloxane, hexaethyldisiloxane, hexapropyldisiloxane, hexaphenyldisiloxane, 1,3-divinyltetramethyldisiloxane, 1,3-dichlorotetramethyldisiloxane, 1,3-dibromotetramethyldisiloxane, chloromethylpentamethyldisiloxane, and 1,3-bis(chloromethyl)tetramethyldisiloxane, dimethylpolysiloxane, and methylphenylpolysiloxane. Examples of a preferable partially hydrogenated polysiloxane include a methyl hydrogen polysiloxane having a degree of hydrogenation of 10 to 80%. Examples of a preferable cyclic polysiloxane include hexamethylcyclotrisiloxane, octamethylcyclotetrasiloxane, decamethylcyclopentasiloxane, 2,4,6-trimethylcyclotrisiloxane, and 2,4,6,8-tetramethylcyclotetrasiloxane. Examples of a preferable modified polysiloxane include a higher fatty acid group-substituted dimethylsiloxane, an epoxy group-substituted dimethylsiloxane, and a polyoxyalkylene group-substituted dimethylsiloxane.

Among these, decamethylcyclopentasiloxane and dimethylpolysiloxane are preferable, and decamethylcyclopentasiloxane is more preferable.

The content of titanium, magnesium, the halogen atom, and the internal electron donor compound in the solid catalyst component used in connection with the production method according to one embodiment of the invention is not particularly limited.

The content of titanium (titanium atoms) in the solid catalyst component is preferably 0.1 to 10 mass %, more preferably 0.5 to 8.0 mass %, and still more preferably 1.0 to 5.0 mass %.

The content of magnesium (magnesium atoms) in the solid catalyst component is preferably 10 to 40 mass %, more preferably 10 to 30 mass %, and still more preferably 13 to 25 mass %.

The content of the halogen atom in the solid catalyst component is preferably 20 to 89 mass %, more preferably 30 to 85 mass %, and still more preferably 40 to 75 mass %.

The content of the internal electron donor compound in the solid catalyst component is preferably 0.5 to 40 mass %, more preferably 1 to 30 mass %, and still more preferably 2 to 25 mass %.

The solid catalyst component used in connection with the production method according to one embodiment of the invention may further include a reagent that includes silicon, phosphorus, or a metal (e.g., aluminum) in addition to the above components.

Examples of the reagent include an organosilicon compound that includes an Si—O—C linkage, an organosilicon compound that includes an Si—N—C linkage, a phosphoric acid compound that includes a P—O linkage, an organoaluminum compound (e.g., trialkylaluminum, dialkoxyaluminum chloride, alkoxyaluminum dihalide, and trialkoxyaluminum), and an aluminum trihalide. Among these, an organosilicon compound that includes an Si—O—C linkage, an organosilicon compound that includes an Si—N—C linkage, and an organoaluminum compound are preferable.

When the solid catalyst component includes such a reagent, it is possible to easily improve polymerization activity and stereoregularity when polymerizing propylene or propylene and an additional olefin.

The solid catalyst component used in connection with the production method according to one embodiment of the invention may be produced by bringing a titanium compound, a magnesium compound, an optional halogen compound (excluding a titanium compound when the titanium compound is a titanium halide compound), and the internal electron donor compound into contact with each other, for example.

Examples of the titanium compound include a tetravalent titanium compound represented by the following general formula (V).

$$\text{Ti}(OR^{12})_jX_{4-j} \quad\quad (V)$$

wherein $R^{12}$ is a hydrocarbon group having 1 to 10 carbon atoms, provided that a plurality of $R^{12}$ are either identical to or different from each other when a plurality of $OR^{12}$ are present, X is a halogen atom, provided that a plurality of X are either identical to or different from each other when a plurality of X are present, and j is an integer from 0 to 4.

The tetravalent titanium compound represented by the general formula (V) is one or more compounds selected from an alkoxytitanium, a titanium halide, and an alkoxytitanium halide.

Specific examples of the tetravalent titanium compound include a titanium tetrahalide such as titanium tetrafluoride, titanium tetrachloride, titanium tetrabromide, and titanium tetraiodide, an alkoxytitanium trihalide such as methoxytitanium trichloride, ethoxytitanium trichloride, propoxytitanium trichloride, and n-butoxytitanium trichloride, a dialkoxytitanium dihalide such as dimethoxytitanium dichloride, diethoxytitanium dichloride, dipropoxytitanium dichloride, and di-n-butoxytitanium dichloride, and a trialkoxytitanium halide such as trimethoxytitanium chloride, triethoxytitanium chloride, tripropoxytitanium chloride, and tri-n-butoxytitanium chloride.

Among these, a halogen-containing titanium compound is preferable, a titanium tetrahalide such as titanium tetrachloride, titanium tetrabromide, and titanium tetraiodide is more preferable, and titanium tetrachloride is particularly preferable. These titanium compounds may be used either alone or in combination. The tetravalent titanium compound represented by the general formula (V) may be used in a state in which the tetravalent titanium compound is diluted with a hydrocarbon compound, a halogenated hydrocarbon compound, or the like.

Examples of the magnesium compound used to produce the solid catalyst component include one or more magnesium compounds selected from a magnesium dihalide, a dialkylmagnesium, an alkylmagnesium halide, a dialkoxymagnesium, a diaryloxymagnesium, an alkoxymagnesium halide, a fatty acid magnesium salt, and the like. Among these, a magnesium dihalide, a mixture of a magnesium dihalide and a dialkoxymagnesium, and a dialkoxymagnesium are preferable, and a dialkoxymagnesium is particularly preferable.

Examples of the dialkoxymagnesium include one or more compounds selected from dimethoxymagnesium, diethoxymagnesium, dipropoxymagnesium, dibutoxymagnesium, ethoxymethoxymagnesium, ethoxypropoxymagnesium, butoxyethoxymagnesium, and the like. These dialkoxymagnesiums may be prepared by reacting magnesium metal with an alcohol in the presence of a halogen, a halogen-containing metal compound, or the like.

It is preferable that the magnesium compound that is used to produce the solid catalyst component be granular or powdery. The magnesium compound may have an indefinite shape or a spherical shape.

For example, when a spherical dialkoxymagnesium is used, a polymer powder obtained by polymerization has a better particle shape and a narrow particle size distribution. This makes it possible to improve the handling capability of the polymer powder during polymerization, and easily reduce or suppress the occurrence of a problem such as clogging caused by a fine powder included in the polymer powder.

The spherical dialkoxymagnesium need not necessarily have a perfectly spherical shape, but may have an elliptical shape or a potato-like shape. The ratio (l/w) of the major axis diameter (l) to the minor axis diameter (w) of the spherical dialkoxymagnesium is preferably 3 or less, more preferably 1 to 2, and still more preferably 1 to 1.5.

The average particle size of the dialkoxymagnesium is preferably 1 to 200 μm, and more preferably 5 to 150 μm. When the dialkoxymagnesium has a spherical shape, the average particle size of the dialkoxymagnesium is preferably 1 to 100 μm, more preferably 5 to 50 μm, and still more preferably 10 to 40 μm.

It is preferable that the dialkoxymagnesium have a narrow particle size distribution, and have a low fine powder content and a low coarse powder content. More specifically, it is preferable that the dialkoxymagnesium include particles having a particle size (measured using a laser diffraction/scattering particle size distribution analyzer) equal to or less than 5 μm, in a ratio of 20% or less, and more preferably 10% or less. It is preferable that the dialkoxymagnesium include particles having a particle size equal to or more than 100 μm, in a ratio of 10% or less, and more preferably 5% or less.

The particle size distribution ln(D90/D10) (where, D90 is the particle size at 90% in the cumulative volume particle size distribution, and D10 is the particle size at 10% in the cumulative volume particle size distribution) of the dialkoxymagnesium is preferably 3 or less, and more preferably 2 or less.

The spherical dialkoxymagnesium described above may be produced using the method disclosed in JP-A-58-41832, JP-A-62-51633, JP-A-3-74341, JP-A-4-368391, JP-A-8-73388, or the like.

Note that the term "average particle size" used herein in connection with the dialkoxymagnesium refers to the average particle size D50 (i.e., the particle size at 50% in the cumulative volume particle size distribution) measured using a laser diffraction/scattering particle size distribution analyzer. The term "average particle size D10" used herein refers to the particle size at 10% in the cumulative volume particle size distribution measured using a laser diffraction/scattering particle size distribution analyzer, and the term "average particle size D90" used herein refers to the particle size at 90% in the cumulative volume particle size distribution measured using a laser diffraction/scattering particle size distribution analyzer.

The magnesium compound included in the solid catalyst component used in connection with the production method according to one embodiment of the invention may be used in a solid state, or may be used in the form of a solution or a suspension that includes the magnesium compound.

When the magnesium compound is solid, the magnesium compound may be dissolved in a solvent that can dissolve the magnesium compound to prepare a solution that includes the magnesium compound, or may be suspended in a solvent that cannot dissolve the magnesium compound to prepare a suspension that includes the magnesium compound.

When the magnesium compound is liquid, the magnesium compound may be used directly as a solution that includes the magnesium compound, or may be dissolved in a solvent that can dissolve the magnesium compound to prepare a solution that includes the magnesium compound.

Examples of the solvent that can dissolve the solid magnesium compound include one or more compounds selected from the group consisting of an alcohol, an ether, and an ester.

Specific examples of the solvent that can dissolve the solid magnesium compound include an alcohol having 1 to 18 carbon atoms, such as methanol, ethanol, propanol, butanol, pentanol, hexanol, 2-ethylhexanol, octanol, dodecanol, octadecyl alcohol, oleyl alcohol, benzyl alcohol, phenylethyl alcohol, cumyl alcohol, isopropyl alcohol, isopropylbenzyl alcohol, and ethylene glycol; a halogen-containing alcohol having 1 to 18 carbon atoms, such as trichloromethanol, trichloroethanol, and trichlorohexanol; an ether having 2 to 20 carbon atoms, such as methyl ether, ethyl ether, isopropyl ether, butyl ether, amyl ether, tetrahydrofuran, ethyl benzyl ether, dibutyl ether, anisole, and diphenyl ether; a metal acid ester such as tetraethoxytitanium, tetra-n-propoxytitanium, tetraisopropoxytitanium, tetrabutoxytitanium, tetrahexoxytitanium, tetrabutoxyzirconium, and tetraethoxyzirconium; and the like. Among these, an alcohol such as ethanol, propanol, butanol, and 2-ethylhexanol is preferable, and 2-ethylhexanol is particularly preferable.

Examples of the solvent that cannot dissolve the solid magnesium compound include a saturated hydrocarbon solvent and an unsaturated hydrocarbon solvent.

The saturated hydrocarbon solvent and the unsaturated hydrocarbon solvent are safe and have high industrial versatility. Examples of the saturated hydrocarbon solvent and the unsaturated hydrocarbon solvent include one or more compounds selected from a linear or branched aliphatic hydrocarbon compound having a boiling point of 50 to 200° C., such as hexane, heptane, decane, and methylheptane, an alicyclic hydrocarbon compound having a boiling point of 50 to 200° C., such as cyclohexane, ethylcyclohexane, and decahydronaphthalene, an aromatic hydrocarbon compound having a boiling point of 50 to 200° C., such as toluene, xylene, and ethylbenzene, and the like. The saturated hydrocarbon solvent and the unsaturated hydrocarbon solvent are preferably one or more compounds selected from a linear aliphatic hydrocarbon compound having a boiling point of 50 to 200° C., such as hexane, heptane, and decane, and an aromatic hydrocarbon compound having a boiling point of 50 to 200° C., such as toluene, xylene, and ethylbenzene.

The solid catalyst component may be produced optionally using a halogen compound (excluding a titanium halide compound when the titanium compound is a titanium halide compound).

Examples of the halogen compound include a tetravalent halogen-containing silicon compound.

Specific examples of the halogen compound include a silane tetrahalide such as tetrachlorosilane (silicon tetrachloride) and tetrabromosilane, and an alkoxy group-containing halogenated silane such as methoxytrichlorosilane, ethoxytrichlorosilane, propoxytrichlorosilane, n-butoxytrichlorosilane, dimethoxydichlorosilane, diethoxydichlorosilane, dipropoxydichlorosilane, di-n-butoxydichlorosi lane, trimethoxychlorosilane, triethoxychlorosilane, tripropoxychlorosilane, and tri-n-butoxychlorosilane.

Examples of the internal electron donor compound used to produce the solid catalyst component include those mentioned above.

When the solid catalyst component includes a polysiloxane, examples of the polysiloxane used to produce the solid catalyst component include those mentioned above.

The solid catalyst component used in connection with the production method according to one embodiment of the invention may be produced using a method that co-pulverizes a solid magnesium compound that does not have a reducing capability, the internal electron donor compound, and a titanium halide, a method that brings a magnesium halide compound that includes an alcohol or the like, the internal electron donor compound, and a titanium halide into contact with each other in the presence of an inert hydrocarbon solvent, a method that brings a dialkoxymagnesium, the internal electron donor compound, and a titanium halide into contact with each other in the presence of an inert hydrocarbon solvent, a method that brings a magnesium compound having a reducing capability, the internal electron donor compound, and a titanium halide into contact with each other to precipitate a solid catalyst, or the like.

Specific examples of the method for producing the solid catalyst component are listed below (see (1) to (16)).

When implementing the methods (1) to (16), two or more internal electron donor compounds may be used in combination. In this case, the two or more internal electron donor compounds may be used for a single reaction, or may be used successively.

When implementing the methods (1) to (16), the components may be brought into contact with each other in the presence of a reagent (e.g., silicon, phosphorus, or aluminum) and a surfactant.

(1) A magnesium halide is dissolved in an alkoxytitanium compound, and an organosilicon compound is brought into contact with the solution to obtain a solid product. The solid product is reacted with a titanium halide, and the internal electron donor compound is reacted with the resulting product (either simultaneously or successively) to produce a solid catalyst component for olefin polymerization.

(2) A magnesium halide and an alcohol are reacted to obtain a homogeneous solution, and a carboxylic anhydride is brought into contact with the homogeneous solution. A titanium halide and the internal electron donor compound are reacted with the solution to obtain a solid, and a titanium halide is brought into contact with the solid to produce a solid catalyst component for olefin polymerization.

(3) Magnesium metal, butyl chloride, and a dialkyl ether are reacted to synthesize an organomagnesium compound, and an alkoxytitanium is reacted with the organomagnesium compound to obtain a solid product. The internal electron donor compound and a titanium halide are simultaneously or successively reacted with the solid product to produce a solid catalyst component for olefin polymerization.

(4) An organomagnesium compound such as a dialkylmagnesium and an organoaluminum compound are reacted with an alcohol in the presence of a hydrocarbon solvent to obtain a homogeneous solution, and a silicon compound such as silicon tetrachloride is brought into contact with the solution to obtain a solid product. A titanium halide and the internal electron donor compound are reacted with the solid product in the presence of an aromatic hydrocarbon solvent, and titanium tetrachloride is brought into contact with the resulting product to produce a solid catalyst component for olefin polymerization.

(5) Magnesium chloride, a tetraalkoxytitanium, and a fatty alcohol are reacted in the presence of a hydrocarbon solvent to obtain a homogeneous solution, and a titanium halide is brought into contact with the solution. The mixture is then heated to precipitate a solid, and the internal electron donor compound is brought into contact with the solid (either simultaneously or successively). The mixture is then reacted with a titanium halide to produce a solid catalyst component for olefin polymerization.

In this case, a treatment using an internal electron donor compound that differs from the above internal electron donor compound may be added.

(6) A magnesium metal powder, an alkylmonohalogen compound, and iodine are reacted, and a tetraalkoxytitanium, an acid halide, and a fatty alcohol are reacted with the mixture in the presence of a hydrocarbon solvent to obtain a homogeneous solution. After the addition of titanium tetrachloride to the solution, the mixture is heated to precipitate a solid, and the internal electron donor compound is brought into contact with the solid (either simultaneously or successively). The mixture is then reacted with titanium tetrachloride to produce a solid catalyst component for olefin polymerization.

(7) A dialkoxymagnesium is suspended in a hydrocarbon solvent, and brought into contact with titanium tetrachloride. The mixture is heated, and brought into contact with the internal electron donor compound (either simultaneously or successively) to obtain a solid product. The solid product is washed with a hydrocarbon solvent, and brought into contact with titanium tetrachloride in the presence of a hydrocarbon solvent to produce a solid catalyst component for olefin polymerization.

In this case, the solid component may be heated in the presence or absence of a hydrocarbon solvent. A treatment using an internal electron donor compound that differs from the above internal electron donor compound may be added.

(8) A dialkoxymagnesium is suspended in a hydrocarbon solvent, and brought into contact with a titanium halide and the internal electron donor compound to obtain a solid product. The solid product is washed with an inert organic solvent, and brought into contact with a titanium halide in the presence of a hydrocarbon solvent to produce a solid catalyst component for olefin polymerization.

In this case, the solid component and a titanium halide may be brought into contact with each other two or more times.

(9) A dialkoxymagnesium, calcium chloride, and an alkoxy group-containing silicon compound are co-pulverized. The pulverized solid is suspended in a hydrocarbon solvent, and reacted with a titanium halide and the internal electron donor compound. A titanium halide is brought into contact with the mixture to produce a solid catalyst component for olefin polymerization.

(10) A dialkoxymagnesium and the internal electron donor compound are suspended in a hydrocarbon solvent, and brought into contact (reacted) with a titanium halide to obtain a solid product. The solid product is washed with a hydrocarbon solvent, and brought into contact with a titanium halide in the presence of a hydrocarbon solvent to produce a solid catalyst component for olefin polymerization.

(11) An aliphatic magnesium such as magnesium stearate is reacted with a titanium halide and the internal electron donor compound. A titanium halide is then brought into contact with the mixture to produce a solid catalyst component for olefin polymerization.

(12) A dialkoxymagnesium is suspended in a hydrocarbon solvent, and brought into contact with a titanium halide. The mixture is heated, and reacted with the internal electron donor compound (either simultaneously or successively) to obtain a solid product. The solid product is washed with a hydrocarbon solvent, and brought into contact with a titanium halide in the presence of a hydrocarbon solvent to produce a solid catalyst component for olefin polymerization, wherein aluminum chloride is brought into contact in the suspension/contact step or the contact/reaction step.

Note that a treatment using an internal electron donor compound that differs from the above internal electron donor compound may be added.

(13) A dialkoxymagnesium, 2-ethylhexyl alcohol, and carbon dioxide are reacted in the presence of a hydrocarbon solvent to obtain a homogeneous solution. A titanium halide and the internal electron donor compound are reacted with the solution (either simultaneously or successively) to obtain a solid. The solid is dissolved in tetrahydrofuran, and a solid product is precipitated. A titanium halide is reacted with the solid product (optionally two or more times) to produce a solid catalyst component for olefin polymerization.

Note that a silicon compound such as tetrabutoxysilane may be used in the contact step, the contact/reaction step, or the dissolution step.

(14) Magnesium chloride, an organic epoxy compound, and a phosphoric acid compound are suspended in a hydrocarbon solvent, and heated to obtain a homogeneous solution. A carboxylic anhydride and a titanium halide are reacted with the solution to obtain a solid product. The internal electron donor compound is reacted with the solid product (either simultaneously or successively), and the resulting reaction product is washed with a hydrocarbon solvent. A titanium halide is brought into contact with the reaction product to produce a solid catalyst component for olefin polymerization.

(15) A dialkoxymagnesium, a titanium compound, and the internal electron donor compound are reacted in the presence of a hydrocarbon solvent, and a silicon compound such as polysiloxane is reacted with the resulting reaction product. A titanium halide and a metal salt of an organic acid are sequentially reacted with the mixture, and a titanium halide is brought into contact with the mixture to produce a solid catalyst component for olefin polymerization.

(16) A dialkoxymagnesium and the internal electron donor compound are suspended in a hydrocarbon solvent. The suspension is heated, and brought into contact with a silicon halide. The mixture is brought into contact with a titanium halide to obtain a solid product. The solid product is washed with a hydrocarbon solvent, and brought into contact with a titanium halide in the presence of a hydrocarbon solvent to produce a solid catalyst component for olefin polymerization.

In this case, the solid component may be heated in the presence or absence of a hydrocarbon solvent.

When implementing the methods (1) to (16), a titanium halide and a hydrocarbon solvent may be brought into contact with the washed solid catalyst component at 20 to 100° C., the mixture may be heated to effect a reaction (secondary reaction), and washed with an inert organic solvent that is liquid at room temperature, and this operation may be repeated 1 to 10 times in order to further improve the polymerization activity when polymerizing an olefin, and the stereoregularity of the resulting polymer.

The solid catalyst component can suitably be produced using any of the methods (1) to (16). It is preferable to produce the solid catalyst component using the method (1), (3), (4), (5), (7), (8), or (10), and particularly preferably the method (3), (4), (7), (8), or (10), since a solid catalyst component for olefin polymerization that ensures high stereoregularity can be obtained.

It is most preferable to produce the solid catalyst component by suspending a dialkoxymagnesium and the internal electron donor compound in a hydrocarbon solvent selected from a linear hydrocarbon, a branched aliphatic hydrocarbon, an alicyclic hydrocarbon, and an aromatic hydrocarbon, adding the suspension to a titanium halide to effect a reaction to obtain a solid product, washing the solid product with a hydrocarbon solvent, and bringing the internal electron donor compound into contact with the solid product in the presence of a hydrocarbon solvent.

The solid catalyst component obtained using the above method may be brought into contact with the organosilicon compound that includes an Si—O—C linkage, the organosilicon compound that includes an Si—N—C linkage, and the organoaluminum compound (optional), from the viewpoint of improving the polymerization activity and the hydrogen response of the solid catalyst component.

It is preferable to bring the solid catalyst component into contact with these compounds in the presence of a hydrocarbon solvent. After bringing the solid catalyst component into contact with each component, the mixture is sufficiently washed with a hydrocarbon solvent in order to remove unnecessary components. The solid catalyst component may be repeatedly brought into contact with the above compounds.

When producing the solid catalyst component, the components are preferably brought into contact with each other at a temperature of −10 to 100° C., more preferably 0 to 90° C., and still more preferably 20 to 80° C.

The components are preferably brought into contact with each other for 1 minute to 10 hours, more preferably 10 minutes to 5 hours, and still more preferably 30 minutes to 2 hours.

The components may be brought into contact with each other in an arbitrary ratio. The organosilicon compound that includes an Si—O—C linkage, and the organosilicon compound that includes an Si—N—C linkage are preferably used in an amount of 0.2 to 20 mol, more preferably 0.5 to 10 mol, and still more preferably 1 to 5 mol, based on 1 mol of the titanium atoms included in the solid catalyst component. The organoaluminum compound represented by the general formula (I) is preferably used in an amount of 0.5 to 50 mol, more preferably 1 to 20 mol, and still more preferably 1.5 to 10 mol, based on 1 mol of the titanium atoms included in the solid catalyst component.

It is preferable to remove the residual solvent from the resulting solid catalyst component so that the mass ratio of the solvent based on the solid component is ⅓ or less, and preferably ⅙ to 1/20, to obtain a powdery solid component.

The amount of each component used when producing the solid catalyst component differs depending on the production method. For example, the tetravalent titanium halide compound is used in an amount of 0.5 to 100 mol, preferably 0.5 to 50 mol, and more preferably 1 to 10 mol, based on 1 mol of the magnesium compound. The internal electron donor compound and the magnesium compound are used in a total amount of 0.01 to 10 mol, preferably 0.01 to 1 mol, and more preferably 0.02 to 0.6 mol, based on 1 mol of the magnesium compound. The solvent is used in an amount of 0.001 to 500 mol, preferably 0.001 to 100 mol, and more preferably 0.005 to 10 mol, based on 1 mol of the magnesium compound. The polysiloxane is used in an amount of 0.01 to 100 g, preferably 0.05 to 80 g, and more preferably 1 to 50 g, based on 1 mol of the magnesium compound.

The olefin polymerization catalyst used in connection with the production method according to one embodiment of the invention includes the solid catalyst component, a specific organoaluminum compound, and a specific external electron donor compound. The olefin polymerization catalyst is produced by bringing these components into contact with each other. An olefin can be polymerized or copolymerized in the presence of the catalyst.

The organoaluminum compound represented by the following general formula (I) is used as the organoaluminum compound that is included in the olefin polymerization catalyst used in connection with the production method according to one embodiment of the invention.

$$R^1_p AlQ_{3-p} \qquad (I)$$

wherein $R^1$ is a hydrocarbyl group having 1 to 6 carbon atoms, p is a real number that satisfies $0<p\leq 3$, provided that a plurality of $R^1$ are either identical to or different from each other when a plurality of $R^1$ are present, and Q is a hydrogen atom, a hydrocarbyloxy group having 1 to 6 carbon atoms, or a halogen atom, provided that a plurality of Q are either identical to or different from each other when a plurality of Q are present.

p in the general formula (I) (that represents an organoaluminum compound) is a real number that satisfies $0<p\leq 3$, preferably a real number from 2 to 3, and more preferably a real number from 2.5 to 3.

$R^1$ in the general formula (I) (that represents an organoaluminum compound) is a hydrocarbyl group having 1 to 6 carbon atoms, preferably a hydrocarbyl group having 1 to 5 carbon atoms, and more preferably a hydrocarbyl group having 2 to 4 carbon atoms.

Specific examples of $R^1$ in the general formula (I) (that represents an organoaluminum compound) include an ethyl group, an isobutyl group, and the like.

When a plurality of $R^1$ are present in the general formula (I) (that represents an organoaluminum compound), the plurality of $R^1$ are either identical to or different from each other.

Q in the general formula (I) (that represents an organoaluminum compound) is a hydrogen atom, a hydrocarbyloxy group having 1 to 6 carbon atoms, or a halogen atom.

When Q in the general formula (I) (that represents an organoaluminum compound) is a hydrocarbyloxy group, Q is a hydrocarbyloxy group having 1 to 6 carbon atoms, preferably a hydrocarbyloxy group having 1 to 5 carbon atoms, and more preferably a hydrocarbyloxy group having 1 to 4 carbon atoms.

Specific examples of the hydrocarbyloxy group that may be represented by Q in the general formula (I) (that represents an organoaluminum compound) include an ethoxy group, a phenoxy group, and the like.

Specific examples of the halogen atom that may be represented by Q in the general formula (I) (that represents an organoaluminum compound) include a chlorine atom, a bromine atom, and the like.

Specific examples of the organoaluminum compound represented by the general formula (I) include a trialkylaluminum such as triethylaluminum, triisopropylaluminum, tri-n-butylaluminum, tri-n-hexylaluminum, and triisobutylaluminum, an alkylaluminum halide such as diethylaluminum chloride and diethylaluminum bromide, diethylaluminum hydride, and the like. Among these, one or more compounds selected from an alkylaluminum halide such as diethylaluminum chloride, and a trialkylaluminum such as triethylaluminum, tri-n-butylaluminum, and triisobutylaluminum, are preferable, and one or more compounds selected from triethylaluminum and triisobutylaluminum are more preferable.

Since the olefin polymerization catalyst used in connection with the production method according to one embodiment of the invention includes the organoaluminum compound represented by the general formula (I), part of the internal electron donor compound is extracted, and the external electron donor compound described later is easily inserted. It is also possible to preliminarily activate the solid catalyst component for olefin polymerization.

The external electron donor compound represented by the following general formula (II), or the external electron donor compound represented by the following general formula (III), is used as the external electron donor compound that is included in the olefin polymerization catalyst used in connection with the production method according to one embodiment of the invention.

$$R^2 Si(OR^3)_3 \qquad (II)$$

wherein $R^2$ is a hydrogen atom, a linear alkyl group having 1 to 20 carbon atoms, a branched alkyl group having 3 to 20 carbon atoms, a vinyl group, an allyl group, a linear or branched alkenyl group having 3 to 20 carbon atoms, a cycloalkyl group having 3 to 20 carbon atoms, a cycloalkenyl group having 3 to 20 carbon atoms, an aromatic hydrocarbon group having 6 to 24 carbon atoms, a nitrogen atom-containing hydrocarbon group having 2 to 24 carbon atoms that is terminated by a carbon atom, or an amino group having 2 to 24 carbon atoms, and $R^3$ is a linear alkyl group having 1 to 20 carbon atoms, a branched alkyl group having 3 to 20 carbon atoms, a vinyl group, an allyl group, a linear or branched alkenyl group having 3 to 20 carbon atoms, a cycloalkyl group having 3 to 20 carbon atoms, a cycloalkenyl group having 3 to 20 carbon atoms, or an aromatic hydrocarbon group having 6 to 24 carbon atoms, provided that the three $R^3$ are either identical to or different from each other.

$$(R^4 R^5 N)Si(OR^6)_3 \qquad (III)$$

wherein $R^4$ and $R^5$ are a hydrogen atom, a linear alkyl group having 1 to 20 carbon atoms, a branched alkyl group having 3 to 20 carbon atoms, a vinyl group, an allyl group, a linear or branched alkenyl group having 3 to 20 carbon atoms, a cycloalkyl group having 3 to 20 carbon atoms, a cycloalkenyl group having 3 to 20 carbon atoms, an aromatic hydrocarbon group having 6 to 24 carbon atoms, a nitrogen atom-containing hydrocarbon group having 2 to 24 carbon atoms that is terminated by a carbon atom, or an amino group having 2 to 24 carbon atoms, provided that $R^4$ and $R^5$ are either identical to or different from each other, and are optionally bonded to each other to form a ring, and $R^6$ is a linear alkyl group having 1 to 20 carbon atoms, a branched alkyl group having 3 to 20 carbon atoms, a vinyl group, an allyl group, a linear or branched alkenyl group having 3 to 20 carbon atoms, a cycloalkyl group having 3 to 20 carbon atoms, a cycloalkenyl group having 3 to 20 carbon atoms, or an aromatic hydrocarbon group having 6 to 24 carbon atoms, provided that the three $R^6$ are either identical to or different from each other.

The external electron donor compound represented by the following general formula (II) may be used as the external electron donor compound that is used in connection with the production method according to one embodiment of the invention.

$$R^2Si(OR^3)_3 \quad (II)$$

wherein $R^2$ is a hydrogen atom, a linear alkyl group having 1 to 20 carbon atoms, a branched alkyl group having 3 to 20 carbon atoms, a vinyl group, an allyl group, a linear or branched alkenyl group having 3 to 20 carbon atoms, a cycloalkyl group having 3 to 20 carbon atoms, a cycloalkenyl group having 3 to 20 carbon atoms, an aromatic hydrocarbon group having 6 to 24 carbon atoms, a nitrogen atom-containing hydrocarbon group having 2 to 24 carbon atoms that is terminated by a carbon atom, or an amino group having 2 to 24 carbon atoms, and $R^3$ is a linear alkyl group having 1 to 20 carbon atoms, a branched alkyl group having 3 to 20 carbon atoms, a vinyl group, an allyl group, a linear or branched alkenyl group having 3 to 20 carbon atoms, a cycloalkyl group having 3 to 20 carbon atoms, a cycloalkenyl group having 3 to 20 carbon atoms, or an aromatic hydrocarbon group having 6 to 24 carbon atoms, provided that the three $R^3$ are either identical to or different from each other.

An external electron donor compound represented by the following general formula (IIa) is preferable as the external electron donor compound represented by the general formula (II).

$$R^7Si(OR^8)_3 \quad (IIa)$$

wherein $R^7$ is a hydrogen atom, a linear alkyl group having 1 to 12 carbon atoms, a branched alkyl group having 3 to 12 carbon atoms, a vinyl group, an allyl group, a linear or branched alkenyl group having 3 to 12 carbon atoms, a cycloalkyl group having 3 to 12 carbon atoms, a cycloalkenyl group having 3 to 12 carbon atoms, an aromatic hydrocarbon group having 6 to 12 carbon atoms, a nitrogen atom-containing hydrocarbon group having 2 to 12 carbon atoms that is terminated by a carbon atom, or an amino group having 2 to 12 carbon atoms, and $R^8$ is a linear alkyl group having 1 to 12 carbon atoms, a branched alkyl group having 3 to 12 carbon atoms, a vinyl group, an allyl group, a linear or branched alkenyl group having 3 to 12 carbon atoms, a cycloalkyl group having 3 to 12 carbon atoms, a cycloalkenyl group having 3 to 12 carbon atoms, or an aromatic hydrocarbon group having 6 to 12 carbon atoms, provided that the three $R^8$ are either identical to or different from each other.

$R^2$ in the general formula (II) (that represents an external electron donor compound) is a hydrogen atom, a linear alkyl group having 1 to 20 carbon atoms, a branched alkyl group having 3 to 20 carbon atoms, a vinyl group, an allyl group, a linear or branched alkenyl group having 3 to 20 carbon atoms, a cycloalkyl group having 3 to 20 carbon atoms, a cycloalkenyl group having 3 to 20 carbon atoms, an aromatic hydrocarbon group havinging 6 to 24 carbon atoms, a nitrogen atom-containing hydrocarbon group having 2 to 24 carbon atoms that is terminated by a carbon atom, or an amino group having 2 to 24 carbon atoms.

Specific examples of $R^2$ in the general formula (II) (that represents an external electron donor compound) include a methyl group, an ethyl group, an n-propyl group, an isopropyl group, an n-butyl group, an isobutyl group, a t-butyl group, an n-pentyl group, a neopentyl group, an n-hexyl group, an n-octyl group, an n-decyl group, a cyclopentyl group, a cyclohexyl group, a vinyl group, an allyl group, a 3-butenyl group, a 4-hexenyl group, a 5-hexenyl group, a 7-octenyl group, a 10-dodecenyl group, an isopropenyl group, an isobutenyl group, an isopentenyl group, a 2-ethyl-3-hexenyl group, a phenyl group, a cyclopropenyl group, a cyclopentenyl group, a cyclohexenyl group, a cyclooctenyl group, a norbornene group, a methylphenyl group, a dimethylphenyl group, an ethylphenyl group, a benzyl group, a 1-phenylethyl group, a 2-phenylethyl group, a 2-phenylpropyl group, a 1-phenylbutyl group, a 4-phenylbutyl group, a 2-phenylheptyl group, a tolyl group, a xylyl group, a naphthyl group, a 1,8-dimethylnaphthyl group, a methylaminomethyl group, a dimethylaminomethyl group, an ethylaminomethyl group, a diethylaminomethyl group, a propylaminomethyl group, a dipropylaminomethyl group, a methylaminoethyl group, a dimethylaminoethyl group, an ethylaminoethyl group, a diethylaminoethyl group, a propylaminoethyl group, a dipropylaminoethyl group, a butylaminoethyl group, a dibutylaminoethyl group, a pentylaminoethyl group, a dipentylaminoethyl group, a hexylaminoethyl group, a hexylmethylaminoethyl group, a heptylmethylaminoethyl group, a diheptylaminomethyl group, an octylmethylaminomethyl group, a dioctylaminoethyl group, a nonylaminomethyl group, a dinonylaminomethyl group, a decylaminomethyl group, a didecylamino group, a cyclohexylaminomethyl group, a dicyclohexylaminomethyl group, a phenylaminomethyl group, a diphenylaminomethyl group, a ditolylaminomethyl group, a dinaphthylaminomethyl group, a methylphenylaminoethyl group, an anilino group, a dimethylaminophenyl group, a bisdimethylaminophenyl group, an iminoalkyl group such as a methyliminomethyl group, an ethyliminoethyl group, a propylimino group, a butylimino group, and a phenylimino group, a dimethylamino group, a diethylamino group, a diisopropylamino group, a di-n-butylamino group, a diisobutylamino group, a diphenylamino group, and the like.

$R^3$ in the general formula (H) (that represents an external electron donor compound) is a linear alkyl group having 1 to 20 carbon atoms, a branched alkyl group having 3 to 20 carbon atoms, a vinyl group, an allyl group, a linear or branched alkenyl group having 3 to 20 carbon atoms, a cycloalkyl group having 3 to 20 carbon atoms, a cycloalkenyl group having 3 to 20 carbon atoms, or an aromatic hydrocarbon group having 6 to 24 carbon atoms.

Specific examples of $R^3$ in the general formula (II) (that represents an external electron donor compound) include a methyl group, an ethyl group, an n-propyl group, an isopropyl group, an n-butyl group, an isobutyl group, a t-butyl group, an n-pentyl group, a neopentyl group, an n-hexyl group, an n-octyl group, an n-decyl group, a cyclopentyl group, a cyclohexyl group, a vinyl group, an allyl group, a 3-butenyl group, a 4-hexenyl group, a 5-hexenyl group, a 7-octenyl group, a 10-dodecenyl group, an isopropenyl group, an isobutenyl group, an isopentenyl group, a 2-ethyl-3-hexenyl group, a phenyl group, a cyclopropenyl group, a cyclopentenyl group, a cyclohexenyl group, a cyclooctenyl group, a norbornene group, a methylphenyl group, a dimethylphenyl group, an ethylphenyl group, a benzyl group, a 1-phenylethyl group, a 2-phenylethyl group, a 2-phenylpropyl group, a 1-phenylbutyl group, a 4-phenylbutyl group, a 2-phenylheptyl group, a tolyl group, a xylyl group, a naphthyl group, a 1,8-dimethylnaphthyl group, and the like.

The three $R^3$ in the general formula (II) (that represents an external electron donor compound) are either identical to or different from each other.

$R^7$ in the general formula (IIa) (that represents an external electron donor compound) is a hydrogen atom, a linear alkyl group having 1 to 12 carbon atoms, a branched alkyl group having 3 to 12 carbon atoms, a vinyl group, an allyl group, a linear or branched alkenyl group having 3 to 12 carbon atoms, a cycloalkyl group having 3 to 12 carbon atoms, a cycloalkenyl group having 3 to 12 carbon atoms, an aromatic hydrocarbon group having 6 to 12 carbon atoms, a nitrogen atom-containing hydrocarbon group having 2 to 12 carbon atoms that is terminated by a carbon atom, or an amino group having 2 to 12 carbon atoms. Specific examples of $R^7$ include those mentioned above in connection with $R^2$ that fall under the definitions with regard to $R^7$.

$R^8$ in the general formula (IIa) (that represents an external electron donor compound) is a linear alkyl group having 1 to 12 carbon atoms, a branched alkyl group having 3 to 12 carbon atoms, a vinyl group, an allyl group, a linear or branched alkenyl group having 3 to 12 carbon atoms, a cycloalkyl group having 3 to 12 carbon atoms, a cycloalkenyl group having 3 to 12 carbon atoms, or an aromatic hydrocarbon group having 6 to 12 carbon atoms. Specific examples of $R^8$ include those mentioned above in connection with $R^3$ that fall under the definitions with regard to $R^8$.

Specific examples of the external electron donor compound represented by the general formula (II) include one or more compounds selected from a phenyltrialkoxysilane, an alkyltrialkoxysilane, and a cycloalkyltrialkoxysilane.

The external electron donor compound represented by the general formula (II) is preferably one or more compounds selected from isopropyltriethoxysilane, isopropyltrimethoxysilane, n-propyltriethoxysilane, n-propyltrimethoxysilane, methyltriethoxysilane, methyltrimethoxysilane, ethyltriethoxysilane, ethyltrimethoxysilane, n-butyltriethoxysilane, n-butyltrimethoxysilane, isobutyltriethoxysilane, isobutyltriethoxysilane, t-butyltriethoxysilane, t-butyltrimethoxysilane, cyclopentyltriethoxysilane, cyclohexyltriethoxysilane, phenyltrimethoxysilane, and phenyltriethoxysilane, and more preferably one or more compounds selected from n-propyltriethoxysilane, cyclopentyltriethoxysilane, and phenyltrimethoxysilane.

Specific examples of the external electron donor compound represented by the general formula (IIa) include those mentioned above in connection with the external electron donor compound represented by the general formula (II) that fall under the definitions with regard to the general formula (IIa).

The external electron donor compound represented by the following general formula (III) may be used as the external electron donor compound that is used in connection with the production method according to one embodiment of the invention.

wherein $R^4$ and $R^5$ are a hydrogen atom, a linear alkyl group having 1 to 20 carbon atoms, a branched alkyl group having 3 to 20 carbon atoms, a vinyl group, an allyl group, a linear or branched alkenyl group having 3 to 20 carbon atoms, a cycloalkyl group having 3 to 20 carbon atoms, a cycloalkenyl group having 3 to 20 carbon atoms, an aromatic hydrocarbon group having 6 to 24 carbon atoms, a nitrogen atom-containing hydrocarbon group having 2 to 24 carbon atoms that is terminated by a carbon atom, or an amino group having 2 to 24 carbon atoms, provided that $R^4$ and $R^5$ are either identical to or different from each other, and are optionally bonded to each other to form a ring, and $R^6$ is a linear alkyl group having 1 to 20 carbon atoms, a branched alkyl group having 3 to 20 carbon atoms, a vinyl group, an allyl group, a linear or branched alkenyl group having 3 to 20 carbon atoms, a cycloalkyl group having 3 to 20 carbon atoms, a cycloalkenyl group having 3 to 20 carbon atoms, or an aromatic hydrocarbon group having 6 to 24 carbon atoms, provided that the three $R^6$ are either identical to or different from each other.

An external electron donor compound represented by the following general formula (IIIa) is preferable as the external electron donor compound represented by the general formula (III).

wherein $R^9$ and $R^{10}$ are a hydrogen atom, a linear alkyl group having 1 to 12 carbon atoms, a branched alkyl group having 3 to 12 carbon atoms, a vinyl group, an allyl group, a linear or branched alkenyl group having 3 to 12 carbon atoms, a cycloalkyl group having 3 to 12 carbon atoms, a cycloalkenyl group having 3 to 12 carbon atoms, an aromatic hydrocarbon group having 6 to 12 carbon atoms, a nitrogen atom-containing hydrocarbon group having 2 to 12 carbon atoms that is terminated by a carbon atom, or an amino group having 2 to 12 carbon atoms, provided that $R^9$ and $R^{10}$ are either identical to or different from each other, and are optionally bonded to each other to form a ring, and $R^{11}$ is a linear alkyl group having 1 to 12 carbon atoms, a branched alkyl group having 3 to 12 carbon atoms, a vinyl group, an allyl group, a linear or branched alkenyl group having 3 to 12 carbon atoms, a cycloalkyl group having 3 to 12 carbon atoms, a cycloalkenyl group having 3 to 12 carbon atoms, or an aromatic hydrocarbon group having 6 to 12 carbon atoms, provided that the three $R^{11}$ are either identical to or different from each other.

$R^4$ and $R^5$ in the general formula III) (that represents an external electron donor compound) are a hydrogen atom, a linear alkyl group having 1 to 20 carbon atoms, a branched alkyl group having 3 to 20 carbon atoms, a vinyl group, an allyl group, a linear or branched alkenyl group having 3 to 20 carbon atoms, a cycloalkyl group having 3 to 20 carbon atoms, a cycloalkenyl group having 3 to 20 carbon atoms, an aromatic hydrocarbon group having 6 to 24 carbon atoms, a nitrogen atom-containing hydrocarbon group having 2 to 24 carbon atoms that is terminated by a carbon atom, or an amino group having 2 to 24 carbon atoms, in the same manner as $R^2$ in the general formula (II) (that represents an external electron donor compound).

Specific examples of $R^4$ and $R^5$ in the general formula (III) (that represents an external electron donor compound) include those mentioned above in connection with $R^2$ in the general formula (II) (that represents an external electron donor compound).

$R^6$ in the general formula (III) (that represents an external electron donor compound) is the same as $R^3$ in the general formula (II) (that represents an external electron donor compound). Specific examples of $R^6$ in the general formula (III) include those mentioned above.

Specific examples of $R^9$ and $R^{10}$ in the general formula (IIIa) (that represents an external electron donor compound) include those mentioned above in connection with $R^2$ in the general formula (II) (that represents an external electron donor compound) that fall under the definitions with regard to $R^9$ and $R^{10}$.

Specific examples of $R^{11}$ in the general formula (IIIa) (that represents an external electron donor compound) include those mentioned above in connection with $R^3$ in the general formula (II) (that represents an external electron donor compound) that fall under the definitions with regard to $R^{11}$.

Specific examples of the external electron donor compound represented by the general formula (III) include a (dialkylamino)trialkoxysilane. The external electron donor compound represented by the general formula (III) is preferably one or more compounds selected from diethylaminotriethoxysilane, diethylaminotrimethoxysilane, dimethylaminotriethoxysilane, and dimethylaminotrimethoxysilane.

Specific examples of the external electron donor compound represented by the general formula (IIIa) include those mentioned above in connection with the external electron donor compound represented by the general formula (III) that fall under the definitions with regard to the general formula (IIIa).

The content of the solid catalyst component for olefin polymerization, the organoaluminum compound represented by the general formula (I), the external electron donor compound represented by the general formula (II), and the external electron donor compound represented by the general formula (III) in the olefin polymerization catalyst used in connection with the production method according to one embodiment of the invention is not particularly limited.

The olefin polymerization catalyst used in connection with the production method according to one embodiment of the invention preferably includes the organoaluminum compound represented by the general formula (I) in an amount of 1 to 2,000 mol, more preferably 10 to 1,500 mol, and still more preferably 50 to 1,000 mol, based on 1 mol of the titanium atoms included in the solid catalyst component for olefin polymerization.

The olefin polymerization catalyst used in connection with the production method according to one embodiment of the invention preferably includes the external electron donor compound represented by the general formula (II) and the external electron donor compound represented by the general formula (III) in a total amount of 0.002 to 10 mol, more preferably 0.01 to 2 mol, and still more preferably 0.01 to 0.5 mol, based on 1 mol of the organoaluminum compound represented by the general formula (I).

The production method according to one embodiment of the invention brings the olefin polymerization catalyst into contact with propylene, or brings the olefin polymerization catalyst into contact with propylene and an α-olefin other than propylene.

The α-olefin is at least one olefin selected from an α-olefin having 2 to 20 carbon atoms (excluding propylene having 3 carbon atoms). For example, the α-olefin may be one or more olefins selected from ethylene, 1-butene, 1-pentene, 4-methyl-1-pentene, vinylcyclohexane, and the like. Among these, ethylene and 1-butene are preferable, and ethylene is more preferable.

The olefin polymerization catalyst may be brought into contact with propylene, or brought into contact with propylene and an α-olefin other than propylene, using an arbitrary method.

For example, the organoaluminum compound represented by the general formula (I), and the solid catalyst component for olefin polymerization are sequentially introduced into the polymerization system. After the addition of propylene, or propylene and an α-olefin other than propylene, the external electron donor compound represented by the general formula (II) or the external electron donor compound represented by the general formula (III) is added to the polymerization system to bring the olefin polymerization catalyst into contact with propylene, or bring the olefin polymerization catalyst into contact with propylene and the α-olefin other than propylene.

Alternatively, the organoaluminum compound represented by the general formula (I), the solid catalyst component for olefin polymerization, and the external electron donor compound represented by the general formula (II) or the external electron donor compound represented by the general formula (III) are sequentially introduced into the polymerization system, and propylene, or propylene and an α-olefin other than propylene, are added to (introduced into) the polymerization system to bring the olefin polymerization catalyst into contact with propylene, or bring the olefin polymerization catalyst into contact with propylene and the α-olefin other than propylene.

The production method according to one embodiment of the invention polymerizes propylene, or copolymerizes propylene and an α-olefin, in the presence of the olefin polymerization catalyst to produce a propylene-based block copolymer.

The term "block copolymer" normally refers to a polymer that includes two or more segments that consecutively change in monomer composition. Specifically, the term "block copolymer" normally refers to a polymer in which two or more polymer chains (segments) that differ in polymer primary structure (e.g., type of monomer, type of comonomer, comonomer composition, comonomer content, comonomer sequence, and stereoregularity) are linked within one molecular chain. The term "propylene-based block copolymer" used herein refers to a copolymer that includes polymers that differ in monomer composition and have been produced by multi-step polymerization. Specifically, the term "propylene-based block copolymer" used herein refers to a polymer composition that has the main structure in which two or more polymers that differ in monomer composition are present in respective polymer particles in a mixed state. Note that some of the polymers are linked through a polymer chain.

A propylene-based block copolymer is normally produced by homopolymerizing propylene, or copolymerizing propylene and a small amount of α-olefin (particularly ethylene) in the first step, and copolymerizing propylene and an α-olefin (particularly ethylene), or copolymerizing propylene, ethylene, and 1-butene in the second step.

When implementing the production method according to one embodiment of the invention, the first step and the second step may respectively be performed a plurality of times.

When implementing the production method according to one embodiment of the invention, the olefin monomer such as propylene may be used in a gaseous state or a liquid state, and the first step and the second step may be performed in the presence or absence of an organic solvent.

More specifically, polymerization is effected in the first step while adjusting the polymerization temperature and the polymerization time so that 20 to 90 mass % of the desired propylene-based block copolymer is obtained. In the second step, propylene and ethylene or another α-olefin is introduced, and polymerization is effected while adjusting the reaction conditions so that the ratio of a rubber part such as an ethylene-propylene rubber (EPR) or an ethylene-propylene-1-butene ternary copolymer is 10 to 80 mass % based on the desired propylene-based block copolymer.

It is preferable to implement the second-step process by means of a vapor-phase polymerization reaction in order to suppress elution of the rubber part (e.g., EPR) from the polypropylene particles.

The first-step process and the second-step process may be implemented using a continuous polymerization method or a batch polymerization method.

The first-step polymerization reaction and the second-step polymerization reaction may be implemented in a single step or a plurality of steps. When the first-step polymerization reaction and the second-step polymerization reaction are implemented in a plurality of steps, each step may be implemented under identical conditions, or may be implemented under different conditions.

The polymerization temperature in the first step and the second step is preferably 200° C. or less, and more preferably 100° C. or less.

The polymerization pressure in the first step and the second step is preferably 10 MPa or less, and more preferably 5 MPa or less.

The total polymerization time (i.e., the residence time of the reaction raw materials) in each polymerization step is preferably 1 minute to 5 hours.

When implementing the production method according to one embodiment of the invention, olefins are copolymerized using the olefin polymerization catalyst that includes the solid catalyst component for olefin polymerization, the organoaluminum compound represented by the general formula (I), and the external electron donor compound represented by the general formula (II) or (III) (hereinafter may be referred to as "main polymerization"). The olefin polymerization catalyst (or some of the components of the olefin polymerization catalyst) is brought into contact with propylene, or propylene and an α-olefin other than propylene, prior to the main polymerization in order to further improve the catalytic activity, the stereoregularity and the particle properties of the resulting polymer, and the like. It is normally desirable to bring the olefin polymerization catalyst into contact with propylene, or propylene and an α-olefin other than propylene, while effecting preliminary polymerization. An olefin that is subjected to main polymerization may be used when effecting preliminary polymerization.

Preliminary polymerization may be effected by bringing the olefin polymerization catalyst into contact with the monomer(s), or may be effected by bringing some of the components of the olefin polymerization catalyst into contact with the monomer(s).

Each component of the olefin polymerization catalyst and the monomer(s) may be brought into contact with each other in an arbitrary order when effecting preliminary polymerization. For example, the organoaluminum compound represented by the general formula (I) is added to the preliminary polymerization system that includes an inert gas atmosphere or an olefin gas atmosphere. After bringing the solid catalyst component for olefin polymerization into contact with the organoaluminum compound, an olefin (e.g., propylene), or a mixture that includes propylene and one or more additional olefins, is brought into contact with the mixture included in the preliminary polymerization system, for example.

Alternatively, the organoaluminum compound represented by the general formula (I) is added to the preliminary polymerization system that includes an inert gas atmosphere or an olefin gas atmosphere. After sequentially bringing the external electron donor compound represented by the general formula (II) or (III) and the solid catalyst component for olefin polymerization into contact with the organoaluminum compound, an olefin (e.g., propylene), or a mixture that includes propylene and one or more additional olefins, is brought into contact with the mixture included in the preliminary polymerization system.

The polymerization temperature during preliminary polymerization is preferably 0 to 60° C., and more preferably 0 to 40° C.

The polymerization pressure during preliminary polymerization is preferably 1.0 to 2.0 MPa, and more preferably 1.2 to 1.7 MPa.

The preliminary polymerization time (i.e., the residence time of the reaction raw materials) is preferably 1 to 30 minutes.

Examples of the polymerization method employed when effecting preliminary polymerization or main polymerization include a slurry polymerization method that utilizes an inert hydrocarbon compound such as cyclohexane or heptane as a solvent, a bulk polymerization method that utilizes a solvent such as liquefied propylene, and a vapor-phase polymerization method that substantially does not utilize a solvent.

A block copolymer can be obtained by repeatedly implementing such a polymerization method in a plurality of steps. It is preferable to use the bulk polymerization method and the vapor-phase polymerization method in combination, or use a multi-step vapor-phase polymerization method.

When implementing the production method according to one embodiment of the invention, the electron donor compound (IV) is brought into contact with the product obtained by bringing the olefin polymerization catalyst into contact with propylene, or propylene and an α-olefin other than propylene.

Examples of the electron donor compound (IV) used in connection with the production method according to one embodiment of the invention include those mentioned above in connection with the internal electron donor compound that is included in the solid catalyst component for olefin polymerization.

The electron donor compound (IV) is preferably one or more compounds selected from an organic compound that includes an oxygen atom, such as an alcohol, phenol and a derivative thereof, an ether compound, an organic acid ester, a silicic acid ester, a compound that includes an ether group and an ester group, a carbonic acid ester compound that includes an ether group, an aldehyde, and a ketone, and the like.

More specifically, the electron donor compound (IV) is preferably one or more compounds selected from an alcohol having 1 to 18 carbon atoms, such as methanol, ethanol, propanol, butanol, pentanol, hexanol, 2-ethylhexanol, octanol, dodecanol, octadecyl alcohol, oleyl alcohol, benzyl alcohol, phenylethyl alcohol, cumyl alcohol, isopropyl alcohol, isopropylbenzyl alcohol, and ethylene glycol, and is more preferably one or more compounds selected from methanol, ethanol, and propanol.

When implementing the production method according to one embodiment of the invention, the electron donor compound (IV) may be brought into contact with the product obtained by bringing the olefin polymerization catalyst into contact with propylene, or propylene and an α-olefin other than propylene, at an arbitrary timing during the polymerization process as long as the olefin polymerization catalyst has been formed in the presence of either or both of propylene and an α-olefin. It is preferable to bring the electron donor compound (IV) into contact with the product obtained by bringing the olefin polymerization catalyst into contact with propylene, or propylene and an α-olefin other than propylene, after effecting preliminary polymerization, or after homopolymerizing propylene, or copolymerizing propylene and a small amount of α-olefin (particularly ethylene) in the first step.

When implementing the production method according to one embodiment of the invention, the electron donor compound (IV) may be added in an arbitrary amount as long as the advantageous effects of the invention are not affected. The electron donor compound (IV) is preferably added in an amount of 0.1 to 0.7 mol, more preferably 0.15 to 0.6 mol, and still more preferably 0.2 to 0.5 mol, based on 1 mol of aluminum atoms included in the organoaluminum compound represented by the general formula (I).

Since the production method according to one embodiment of the invention brings the olefin polymerization catalyst into contact with propylene, or propylene and an α-olefin other than propylene, and brings the electron donor compound (IV) into contact with the resulting product, it is possible to achieve excellent polymerization activity during random copolymerization, and increase the content of a random copolymer (rubber part).

The production method according to one embodiment of the invention makes it possible to achieve excellent polymerization activity when homopolymerizing propylene, or copolymerizing propylene and an additional olefin, achieve high polymerization sustainability during random copolymerization, and easily control the content of a random copolymer (rubber part) when producing a propylene-based block copolymer.

Since the resulting propylene-based block copolymer includes a propylene homopolymer (homopolymerization part) or a crystalline propylene random copolymer that includes a specific amount of propylene and an additional α-olefin, the propylene-based block copolymer exhibits excellent stereoregularity and moderate rigidity. Since the propylene-based block copolymer has a high α-olefin content and a high propylene-α-olefin random copolymer (rubber part) content, the propylene-based block copolymer exhibits excellent impact resistance. Specifically, the production method according to one embodiment of the invention can conveniently produce a propylene-based block copolymer that exhibits rigidity, impact resistance, and the like in a well-balanced manner, in high yield.

EXAMPLES

The invention is further described below by way of examples and comparative examples. Note that the invention is not limited to the following examples.

In the examples and the comparative examples, the content of titanium atoms and the internal electron donor compound in the solid catalyst component for olefin polymerization was measured as described below.

Content of Titanium Atoms in Solid Catalyst Component for Olefin Polymerization

The content of titanium atoms in the solid catalyst component for olefin polymerization was determined in accordance with the method (oxidation-reduction titration) specified in JIS 8311-1997 ("Method for determination of titanium in titanium ores").

Content of Internal Electron Donor Compound in Solid Catalyst Component for Olefin Polymerization The content of the internal electron donor compound in the solid catalyst component for olefin polymerization was determined using a gas chromatograph ("GC-14B" manufactured by Shimadzu Corporation) under the conditions listed below.

The number of moles of the internal electron donor compound was calculated from the gas chromatography measurement results using a calibration curve that was drawn in advance using the measurement results at a known concentration.

Measurement Conditions
Column: packed column (diameter: 2.6 mm, length: 2.1 m, Silicone SE-30 10%, Chromosorb WAW DMCS 80/100, manufactured by GL Sciences Ltd.)
Detector: flame ionization detector (FID)
Carrier gas: helium (flow rate: 40 ml/min)
Measurement temperature: vaporization chamber: 280° C., column: 225° C., detector: 280° C., or vaporization chamber: 265° C., column: 180° C., detector: 265° C.

Example 1

(1) Synthesis of Solid Catalyst Component for Olefin Polymerization

A 500 ml round-bottom flask equipped with a stirrer in which the internal atmosphere had been sufficiently replaced by nitrogen gas, was charged with 20 g of diethoxymagnesium and 160 ml of toluene to prepare a suspension. After the addition of 40 ml of titanium tetrachloride to the suspension, the mixture was heated. 6.1 g (21 mmol) of di(n-butyl) phthalate was added to the mixture when the temperature of the mixture had reached 80° C., and the mixture was heated to 110° C. The mixture was reacted at 110° C. for 1 hour with stirring. The mixture was washed three times with 200 ml of toluene (90° C.). After the addition of 40 ml of titanium tetrachloride and 160 ml of toluene, the mixture was heated to 110° C., and reacted for 1 hour with stirring. The mixture was washed seven times with 200 ml of n-heptane (40° C.), and dried under reduced pressure to obtain a solid catalyst component for olefin polymerization. The content of di(n-butyl) phthalate and the content of titanium atoms in the solid catalyst component were measured, and found to be 16.4 mass % and 2.8 mass %, respectively.

(2) Production of Olefin Polymerization Catalyst

An autoclave (internal volume: 2.0 l) equipped with a stirrer in which the internal atmosphere had been completely replaced by nitrogen gas, was charged with 2.4 mmol of triethylaluminum, 0.24 mmol of diethylaminotriethoxysilane, and the solid catalyst component for olefin polymerization obtained as described above (see (1)) (0.002 mmol on a titanium atom basis) to produce an olefin polymerization catalyst (ethylene-propylene copolymerization catalyst).

(3) Production of Propylene-Based Block Copolymer

An autoclave was charged with the olefin polymerization catalyst (ethylene-propylene copolymerization catalyst) obtained as described above (see (2)), and further charged with liquefied propylene (15 mol) and hydrogen gas (partial pressure: 0.16 MPa). After effecting preliminary polymerization at 20° C. for 5 minutes, 30 μm of methanol (electron donor compound (IV)) was added to the autoclave, and a first-step polymerization reaction (homopolymerization) was effected at 70° C. for 75 minutes.

After completion of the first-step polymerization reaction, the monomer was purged while lowering the temperature of the autoclave to room temperature. The mass of the entire autoclave was then measured, and the first-step polymerization amount was calculated from the difference between the measured mass and the mass measured before effecting polymerization.

After connecting the monomer feed line and the like again, ethylene, propylene, and hydrogen were fed to the autoclave in a molar ratio of 1.0/1.0/0.043, and the mixture was heated to 70° C., and reacted at 70° C. for 1 hour under a pressure of 1.2 MPa while feeding ethylene, propylene, and hydrogen in a ratio of 2/2/0.086 (1/min) to obtain a propylene-based block copolymer.

The propylene polymerization activity (homopolymerization activity) (g-PP/(g-catalyst)), the ethylene-propylene block copolymerization (ICP) activity (g-ICP/(g-catalyst)), the block ratio (polymerization ratio (mass %)) in the resulting block copolymer, the content (mass %) of the ethylene-propylene copolymer (EPR) in the resulting block copolymer, and the ethylene content (mass %) in the ethylene-propylene copolymer (EPR), were measured as described below. The results are listed in Table 1.

Propylene Polymerization Activity

The propylene polymerization activity per g of the solid catalyst component per hour (1 h) was calculated using the following expression, and taken as the homopolymerization-step polymerization activity (g-PP/(g-catalyst·h)).

Propylene polymerization activity (g-pp/g-catalyst·h)= mass (g) of polypropylene/(mass (g) of solid catalyst component for olefin polymerization included in olefin polymerization catalyst/1.25 h)

Ethylene-Propylene Block Copolymerization Activity (ICP Activity) (g-ICP/(g-Catalyst·h))

The copolymerization activity (ICP activity) per g of the solid catalyst component per hour (1 h) achieved when an ethylene-propylene block copolymer was produced, was calculated using the following expression, and taken as the copolymerization-step polymerization activity (g-ICP/(g-catalyst·h)).

Ethylene-Propylene Block Copolymerization Activity (ICP Activity) (g-ICP/(g-Catalyst·h))=((I (g)−G (g))/(Mass (g) of Solid Catalyst Component Included in Olefin Polymerization Catalyst/h)

Note that I is the mass (g) of the autoclave after completion of the copolymerization reaction, and G is the mass (g) of the autoclave after unreacted monomers had been removed after completion of homopolymerization.

Block Ratio (Mass %)

The block ratio of the ethylene-propylene block copolymer was calculated using the following expression.

Block ratio (mass %)={(I (g)−G (g))/(I (g)−F (g))}×100

Note that I is the mass (g) of the autoclave after completion of the copolymerization reaction, G is the mass (g) of the autoclave after unreacted monomers had been removed after completion of homopolymerization, and F is the mass (g) of the autoclave.

Ethylene-Propylene Copolymer (EPR) Content (Xylene-Soluble Content in ICP Polymer)

A flask equipped with a stirrer was charged with 5.0 g of the propylene-based block copolymer (ICP propylene polymer) and 250 ml of p-xylene. The external temperature was increased to be equal to or higher than the boiling point (about 150° C.) of xylene, and the block polymer was dissolved over 2 hours while maintaining p-xylene in the flask at the boiling point (137 to 138° C.). The solution was cooled to 23° C. over 1 hour, and an insoluble component and a soluble component were separated by filtration. A solution including the soluble component was collected, and p-xylene was evaporated by heating (drying) under reduced pressure. The mass of the residue was calculated, and the relative ratio (mass %) with respect to the polymer (propylene-based block copolymer) was calculated to determine the EPR content.

Measurement of Ethylene Content in EPR

A small amount of EPR (xylene-soluble component) that was extracted with xylene when calculating the EPR content was sampled, and hot-pressed in the shape of a film. The ethylene content (mass %) in the ethylene-propylene copolymer (EPR) was calculated from the absorbance and the thickness of the film using an IR analyzer (see below).

Analyzer: Avatar manufactured by Thermonicolet

Measurement wavelength: 720 cm$^{-1}$ and 1,150 cm$^{-1}$

Film thickness: 0.15 mm

Ethylene content (mass %) in EPR=−36.437×log(D1150/D720)+31.919 where, D720 is the absorbance at 720 cm$^{-1}$, and D1150 is the absorbance at 1,150 cm$^{-1}$.

Example 2

An olefin polymerization catalyst was produced in the same manner as in Example 1, except that 0.24 mmol of isopropyltriethoxysilane was used instead of 0.24 mmol of diethylaminotriethoxysilane, and a polymerization reaction was effected in the same manner as in Example 1. Various evaluation processes were performed in the same manner as described above. The results are listed in Table 1.

Example 3

An olefin polymerization catalyst was produced in the same manner as in Example 1, except that 0.24 mmol of n-propyltriethoxysilane was used instead of 0.24 mmol of diethylaminotriethoxysilane, and a polymerization reaction was effected in the same manner as in Example 1. Various evaluation processes were performed in the same manner as described above. The results are listed in Table 1.

Example 4

An olefin polymerization catalyst was produced in the same manner as in Example 1, except that 0.24 mmol of t-butyltrimethoxysilane was used instead of 0.24 mmol of diethylaminotriethoxysilane, and a polymerization reaction was effected in the same manner as in Example 1. Various evaluation processes were performed in the same manner as described above. The results are listed in Table 1.

Example 5

An olefin polymerization catalyst was produced in the same manner as in Example 1, except that 40 μl of ethanol was used instead of 30 μl of methanol (electron donor compound (IV)), and a polymerization reaction was effected in the same manner as in Example 1. Various evaluation processes were performed in the same manner as described above. The results are listed in Table 1.

Example 6

An olefin polymerization catalyst was produced in the same manner as in Example 3, except that 40 μl of ethanol was used instead of 30 μl of methanol (electron donor compound (IV)), and a polymerization reaction was effected in the same manner as in Example 1. Various evaluation processes were performed in the same manner as described above. The results are listed in Table 1.

Example 7

An olefin polymerization catalyst was produced in the same manner as in Example 1, except that 30 µl of methanol (electron donor compound (IV)) was added after completion of the homopolymerization reaction (before the start of copolymerization) instead of adding 30 µl of methanol after completion of preliminary polymerization (before the start of first-step (homopropylene) polymerization), and a polymerization reaction was effected in the same manner as in Example 1. Various evaluation processes were performed in the same manner as described above. The results are listed in Table 1.

Comparative Example 1

An olefin polymerization catalyst was produced in the same manner as in Example 1, except that 30 µl of methanol (electron donor compound (IV)) was not added, and a polymerization reaction was effected in the same manner as in Example 1. Various evaluation processes were performed in the same manner as described above. The results are listed in Table 1.

Comparative Example 2

An olefin polymerization catalyst was produced in the same manner as in Example 2, except that 30 µl of methanol (electron donor compound (IV)) was not added, and a polymerization reaction was effected in the same manner as in Example 1. Various evaluation processes were performed in the same manner as described above. The results are listed in Table 1.

Comparative Example 3

An olefin polymerization catalyst was produced in the same manner as in Example 3, except that 30 µl of methanol (electron donor compound (IV)) was not added, and a polymerization reaction was effected in the same manner as in Example 1. Various evaluation processes were performed in the same manner as described above. The results are listed in Table 1.

Comparative Example 4

An olefin polymerization catalyst was produced in the same manner as in Example 4, except that 30 µl of methanol (electron donor compound (IV)) was not added, and a polymerization reaction was effected in the same manner as in Example 1. Various evaluation processes were performed in the same manner as described above. The results are listed in Table 1.

Comparative Example 5

An olefin polymerization catalyst was produced in the same manner as in Example 1, except that a mixture including 0.24 mmol of diethylaminotriethoxysilane and 30 µl of methanol was added instead of 0.24 mmol of diethylaminotriethoxysilane, and a polymerization reaction was effected in the same manner as in Example 1, except that 30 µl of methanol was not added after completion of preliminary polymerization. Various evaluation processes were performed in the same manner as described above. The results are listed in Table 1.

Comparative Example 6

A polymerization reaction was effected in the same manner as in Example 1, except that preliminary polymerization was performed after adding 30 µl of methanol to the olefin polymerization catalyst (see (2) in Example 1), and methanol was not added after completion of preliminary polymerization (see (3) in Example 1). Various evaluation processes were performed in the same manner as described above. The results are listed in Table 1.

Comparative Example 7

An olefin polymerization catalyst was produced in the same manner as in Example 1, except that 0.24 mmol of cyclohexylmethyldimethoxysilane was used instead of 0.24 mmol of diethylaminotriethoxysilane, and 30 µl of methanol (electron donor compound (IV)) was not added, and a polymerization reaction was effected in the same manner as in Example 1. Various evaluation processes were performed in the same manner as described above. The results are listed in Table 1.

Comparative Example 8

An olefin polymerization catalyst was produced in the same manner as in Example 1, except that 0.24 mmol of cyclohexylmethyldimethoxysilane was used instead of 0.24 mmol of diethylaminotriethoxysilane, and a polymerization reaction was effected in the same manner as in Example 1. Various evaluation processes were performed in the same manner as described above. The results are listed in Table 1.

Comparative Example 9

An olefin polymerization catalyst was produced in the same manner as in Example 1, except that 0.24 mmol of diphenyldimethoxysilane was used instead of 0.24 mmol of diethylaminotriethoxysilane, and 30 µl of methanol (electron donor compound (IV)) was not added, and a polymerization reaction was effected in the same manner as in Example 1. Various evaluation processes were performed in the same manner as described above. The results are listed in Table 1.

Comparative Example 10

An olefin polymerization catalyst was produced in the same manner as in Example 1, except that 0.24 mmol of diphenyldimethoxysilane was used instead of 0.24 mmol of diethylaminotriethoxysilane, and a polymerization reaction was effected in the same manner as in Example 1. Various evaluation processes were performed in the same manner as described above. The results are listed in Table 1.

TABLE 1

| | Homo-polymerization-step polymerization activity (g-PP/g-catalyst · h)) | Copolymerization-step polymerization activity (g-ICP/g-catalyst · h)) | Block ratio (mass %) | EPR content (mass %) | Ethylene content in EPR (mass %) |
|---|---|---|---|---|---|
| Example 1 | 43,300 | 12,800 | 22.8 | 17.5 | 49.8 |
| Example 2 | 32,400 | 16,500 | 33.7 | 27.7 | 48.0 |
| Example 3 | 43,700 | 21,000 | 32.5 | 25.5 | 47.3 |
| Example 4 | 23,600 | 4,700 | 16.6 | 14.4 | 43.2 |
| Example 5 | 44,000 | 10,900 | 19.9 | 16.2 | 50.3 |
| Example 6 | 34,300 | 11,800 | 25.6 | 19.1 | 48.6 |
| Example 7 | 42,400 | 15,900 | 27.3 | 22.5 | 49.2 |
| Comparative Example 1 | 41,600 | 7,300 | 14.9 | 12.7 | 49.4 |
| Comparative Example 2 | 29,700 | 6,400 | 17.7 | 13.5 | 48.6 |
| Comparative Example 3 | 40,400 | 8,100 | 16.7 | 13.9 | 47.7 |
| Comparative Example 4 | 23,800 | 3,400 | 12.5 | 11.9 | 43.4 |
| Comparative Example 5 | 37,100 | 5,700 | 13.3 | 10.9 | 48.2 |
| Comparative Example 6 | 33,300 | 4,300 | 11.4 | 11.0 | 47.4 |
| Comparative Example 7 | 57,000 | 9,700 | 14.5 | 12.0 | 40.2 |
| Comparative Example 8 | 56,300 | 10,300 | 15.5 | 11.8 | 40.3 |
| Comparative Example 9 | 41,000 | 7,500 | 15.5 | 12.5 | 42.5 |
| Comparative Example 10 | 40,300 | 7,300 | 15.3 | 12.1 | 42.1 |

As is clear from the results listed in Table 1, when a propylene-based block copolymer was produced by bringing an olefin polymerization catalyst into contact with propylene, or propylene and an α-olefin, and bringing an electron donor compound into contact with the resulting product, the olefin polymerization catalyst including a solid catalyst component for olefin polymerization including titanium, magnesium, a halogen, and an internal electron donor compound, a specific organoaluminum compound, and a specific external electron donor compound (Example 1 to 7), excellent polymerization activity was obtained when homopolymerizing propylene, or copolymerizing propylene and an additional olefin, and a propylene-based copolymer exhibiting excellent stereoregularity and excellent rigidity, and exhibiting excellent impact resistance due to a high ethylene content, and a high content of a propylene-ethylene random copolymer (rubber part) could be conveniently produced in high yield.

On the other hand, when a propylene-based block copolymer was produced by bringing an olefin polymerization catalyst into contact with propylene, or propylene and an α-olefin, without bringing an electron donor compound into contact with the resulting product (Comparative Examples 1 to 7 and 9), or when a propylene-based block copolymer was produced without using the organosilicon compound represented by the general formula (II) or (III) as the external electron donor compound (Comparative Examples 7 to 10), the polymerization activity when subjecting propylene and an additional olefin to random copolymerization was relatively low, and the resulting propylene-based copolymer exhibited inferior impact resistance due to a low content of a propylene-ethylene random copolymer (rubber part) (see Table 1).

INDUSTRIAL APPLICABILITY

The embodiments of the invention thus provide a method for producing a propylene-based copolymer that ensures that excellent polymerization activity is obtained when homopolymerizing propylene, or copolymerizing propylene and ethylene or propylene and an α-olefin other than ethylene, and can conveniently produce a propylene-based copolymer that exhibits excellent stereoregularity, excellent rigidity, and excellent impact resistance in high yield.

The invention claimed is:

1. A method for producing a propylene-based block copolymer comprising:
  a first step of bringing an olefin polymerization catalyst into contact with propylene, and bringing an electron donor compound (IV) into contact with the resulting product so that the propylene is formed into a homopolymer,
  after the first step, a second step of bringing the homopolymer into contact with an olefin other than propylene to form a propylene-based copolymer,
  the olefin polymerization catalyst comprising a solid catalyst component for olefin polymerization that comprises titanium, magnesium, a halogen, and an internal electron donor compound, an organoaluminum compound represented by a general formula (I), and an external electron donor compound represented by a general formula (III), $$R^1_p AlQ_{3-p} \quad (I)$$

wherein $R^1$ is a hydrocarbyl group having 1 to 6 carbon atoms, p is a real number that satisfies $0 < p \leq 3$, provided that a plurality of $R^1$ are either identical to or different from each other when a plurality of $R^1$ are present, and Q is a hydrogen atom,
a hydrocarbyloxy group having 1 to 6 carbon atoms, or a halogen atom, provided that
a plurality of Q are either identical to or different from each other when a plurality of Q are present, $$(R^4 R^5 N)Si(OR^6)_3 \quad (III)$$

wherein $R^4$ and $R^5$ are a hydrogen atom, a linear alkyl group having 1 to 20 carbon atoms, a branched alkyl group having 3 to 20 carbon atoms, a vinyl group, an allyl group, a linear or branched alkenyl group having 3 to 20 carbon atoms, a cycloalkyl group having 3 to 20 carbon atoms, a cycloalkenyl group having 3 to 20 carbon atoms, an aromatic hydrocarbon group having 6 to 24 carbon atoms, a nitrogen atom-containing hydrocarbon group having 2 to 24 carbon atoms that is terminated by a carbon atom, or an amino group having 2 to 24 carbon atoms, provided that $R^4$ and $R^5$ are either identical to or different from each other, and are optionally bonded to each other to form a ring, and $R^6$ is a linear alkyl group having 1 to 20 carbon atoms,
a branched alkyl group having 3 to 20 carbon atoms, a vinyl group, an allyl group,
a linear or branched alkenyl group having 3 to 20 carbon atoms, a cycloalkyl group having 3 to 20 carbon atoms, a cycloalkenyl group having 3 to 20 carbon atoms, or an aromatic hydrocarbon group having 6 to 24 carbon atoms, provided that the three $R^6$ are either identical to or different from each other, and
wherein the electron donor compound (IV) is an alcohol.

2. The method for producing a propylene-based block copolymer according to claim 1, wherein the electron donor compound (IV) is methanol or ethanol.

3. The method for producing a propylene-based block copolymer according to claim 2, wherein
the external electron donor compound represented by the general formula (III) is an external electron donor compound represented by a general formula (IIIa), $$(R^9R^{10}N)Si(OR^{11})_3 \quad \text{(IIIa)}$$

wherein $R^9$ and $R^{10}$ are a hydrogen atom, a linear alkyl group having 1 to 12 carbon atoms, a branched alkyl group having 3 to 12 carbon atoms, a vinyl group, an allyl group, a linear or branched alkenyl group having 3 to 12 carbon atoms, a cycloalkyl group having 3 to 12 carbon atoms, a cycloalkenyl group having 3 to 12 carbon atoms, an aromatic hydrocarbon group having 6 to 12 carbon atoms, a nitrogen atom-containing hydrocarbon group having 2 to 12 carbon atoms that is terminated by a carbon atom, or an amino group having 2 to 12 carbon atoms, provided that $R^9$ and $R^{10}$ are either identical to or different from each other, and are optionally bonded to each other to form a ring, and $R^{11}$ is a linear alkyl group having 1 to 12 carbon atoms,
a branched alkyl group having 3 to 12 carbon atoms, a vinyl group, an allyl group,
a linear or branched alkenyl group having 3 to 12 carbon atoms, a cycloalkyl group having 3 to 12 carbon atoms, a cycloalkenyl group having 3 to 12 carbon atoms, or
an aromatic hydrocarbon group having 6 to 12 carbon atoms, provided that the three $R^{11}$ are either identical to or different from each other.

4. The method for producing a propylene-based block copolymer according to claim 2, wherein the external electron donor compound (III) is one or more compounds selected from diethylaminotriethoxysilane, diethylaminotrimethoxysilane, dimethylaminotriethoxysilane, and dimethylaminotrimethoxysilane.

5. The method for producing a propylene-based block copolymer according to claim 1, wherein
the external electron donor compound represented by the general formula (III) is an external electron donor compound represented by a general formula (IIIa), $$(R^9R^{10}N)Si(OR^{11})_3 \quad \text{(IIIa)}$$

wherein $R^9$ and $R^{10}$ are a hydrogen atom, a linear alkyl group having 1 to 12 carbon atoms, a branched alkyl group having 3 to 12 carbon atoms, a vinyl group, an allyl group, a linear or branched alkenyl group having 3 to 12 carbon atoms, a cycloalkyl group having 3 to 12 carbon atoms, a cycloalkenyl group having 3 to 12 carbon atoms, an aromatic hydrocarbon group having 6 to 12 carbon atoms, a nitrogen atom-containing hydrocarbon group having 2 to 12 carbon atoms that is terminated by a carbon atom, or an amino group having 2 to 12 carbon atoms, provided that $R^9$ and $R^{10}$ are either identical to or different from each other, and are optionally bonded to each other to form a ring, and $R^{11}$ is a linear alkyl group having 1 to 12 carbon atoms,
a branched alkyl group having 3 to 12 carbon atoms, a vinyl group, an allyl group,
a linear or branched alkenyl group having 3 to 12 carbon atoms, a cycloalkyl group having 3 to 12 carbon atoms, a cycloalkenyl group having 3 to 12 carbon atoms, or
an aromatic hydrocarbon group having 6 to 12 carbon atoms, provided that the three $R^{11}$ are either identical to or different from each other.

6. The method for producing a propylene-based block copolymer according to claim 1, wherein the external electron donor compound (III) is one or more compounds selected from diethylaminotriethoxysilane, diethylaminotrimethoxysilane, dimethylaminotriethoxysilane, and dimethylaminotrimethoxysilane.

* * * * *